United States Patent
Bright

(10) Patent No.: US 9,560,914 B2
(45) Date of Patent: Feb. 7, 2017

(54) ORGANIZER KIT

(71) Applicant: Steve Bright, Downingtown, PA (US)

(72) Inventor: Steve Bright, Downingtown, PA (US)

( * ) Notice: Subject to any disclaimer, the term of this patent is extended or adjusted under 35 U.S.C. 154(b) by 0 days.

(21) Appl. No.: 14/450,210

(22) Filed: Aug. 2, 2014

(65) Prior Publication Data

US 2016/0029795 A1 Feb. 4, 2016

(51) Int. Cl.
*A47B 96/06* (2006.01)
*F16M 13/02* (2006.01)
*A47B 96/02* (2006.01)

(52) U.S. Cl.
CPC ............ *A47B 96/068* (2013.01); *A47B 96/02* (2013.01); *A47B 96/063* (2013.01); *F16M 13/022* (2013.01)

(58) Field of Classification Search
CPC ........ H02G 3/125; H02G 3/126; H02G 3/263; A47B 96/068; A47B 61/003; A47B 96/021; A47B 96/024; A47B 96/02; A47B 96/063; A47B 96/06; A47H 1/142; A47G 25/0692; F16M 13/022
USPC ... 248/217.3, 546, 200.1, 264, 57, 300, 248, 248/250; 52/36.4, 317, 655.1, 712, 714, 52/715; 108/29, 30, 42, 12; 312/245; 312/211/123, 211/105.1–105.6
See application file for complete search history.

(56) References Cited

U.S. PATENT DOCUMENTS

| | | | | | |
|---|---|---|---|---|---|
| 2,443,149 A | * | 6/1948 | Rundell | ................... | A47J 47/16 248/264 |
| 3,425,655 A | * | 2/1969 | Cogdill | ..................... | F16L 3/22 211/123 |
| 3,648,626 A | * | 3/1972 | Schuster | ................ | A47B 45/00 108/42 |
| 3,865,336 A | * | 2/1975 | Robertson | .............. | A47B 61/00 108/29 |
| 3,870,157 A | * | 3/1975 | Hayward | ............. | A47B 96/027 108/29 |
| 3,891,091 A | * | 6/1975 | Anderson | .............. | A47H 1/144 211/105.3 |
| 4,125,078 A | * | 11/1978 | Nyquist | ................. | A47B 61/00 108/29 |
| 4,318,487 A | * | 3/1982 | McCarthy | ............. | A47B 45/00 108/42 |
| 4,373,448 A | * | 2/1983 | Pallotta | ................ | A47B 96/021 108/29 |
| 4,508,300 A | * | 4/1985 | Minick | ................... | A47B 57/30 160/135 |
| 4,723,746 A | * | 2/1988 | Gould | .................... | H02G 3/105 174/58 |
| 4,951,908 A | * | 8/1990 | Kallio | ................. | A47B 96/061 108/108 |

(Continued)

*Primary Examiner* — Ingrid M Weinhold
(74) *Attorney, Agent, or Firm* — Joseph E. Maenner; Maenner & Associates, LLC

(57) ABSTRACT

A removable bracket includes a generally planar body having a front face, a rear face, a first longitudinal side, a second longitudinal side, a first lateral side, and a second lateral side. Each of the first lateral side and the second lateral side extends between the first longitudinal side and the second longitudinal side and includes a lip extending outwardly from the front face. A lateral axis bisects the body and a longitudinal axis bisects the body. The body is symmetrical about each of the lateral and longitudinal axes. Two supports extending generally perpendicularly outwardly from the front face proximate to and on either side of the lateral axis. A kit includes a plurality of the brackets, and at least one of a rod, a first shelf, a plurality of extension pieces, and a second shelf.

17 Claims, 46 Drawing Sheets

(56) References Cited

U.S. PATENT DOCUMENTS

| | | | | |
|---|---|---|---|---|
| 5,236,168 A * | 8/1993 | Roy | ..................... | A47G 1/162 |
| | | | | 248/498 |
| 6,101,780 A * | 8/2000 | Kreidt | ................... | E04B 1/2608 |
| | | | | 52/281 |
| 6,279,286 B1 * | 8/2001 | Ichihashi | ............ | E04F 13/0826 |
| | | | | 248/218.4 |
| 6,766,992 B1 * | 7/2004 | Parker | ................... | F16M 13/02 |
| | | | | 248/218.4 |
| 7,178,305 B2 * | 2/2007 | Petrova | ............... | F16B 15/0046 |
| | | | | 52/714 |
| 8,839,588 B2 * | 9/2014 | Philbin | .................... | E04B 1/38 |
| | | | | 52/704 |
| 8,973,330 B2 * | 3/2015 | Egri, II | ............... | E04F 13/0805 |
| | | | | 248/231.81 |

* cited by examiner

330

330

ORGANIZER KIT

BACKGROUND OF THE INVENTION

Field of the Invention

The present invention relates to organizers, and, in particular, to a kit of components that can be assembled to secure organizing devices to a wall or ceiling.

Description of the Related Art

Numerous shelving assemblies and kits have been developed over the years for storing items on walls. Many of the shelving assemblies and kits use wall studs hidden behind finished walls for anchoring support.

Many structures, however such as, for example, garages and sheds, do not have finished walls, leaving unused space for storage between studs. It would be beneficial to develop shelving assemblies and kits to allow storage within that unused space.

SUMMARY OF THE INVENTION

This Summary is provided to introduce a selection of concepts in a simplified form that are further described below in the Detailed Description of the Invention. This Summary is not intended to identify key features or essential features of the claimed subject matter, nor is it intended to be used to limit the scope of the claimed subject matter.

In one embodiment, the present invention is a removable bracket having a generally planar body having a front face, a rear face, a first longitudinal side, a second longitudinal side, a first lateral side, and a second lateral side. Each of the first lateral side and the second lateral side extends between the first longitudinal side and the second longitudinal side and includes a lip extending outwardly from the front face. A lateral axis bisects the body and a longitudinal axis bisects the body. The body is symmetrical about each of the lateral and longitudinal axes. Two supports extending generally perpendicularly outwardly from the front face proximate to and on either side of the lateral axis. At least one spike extends outwardly from the rear face. A kit includes a plurality of the brackets, and at least one of a rod, a first shelf, a plurality of extension pieces, and a second shelf.

In another embodiment, the present invention provides a kit comprising a plurality of the brackets described above and at least one of an elongate rod, a first shelf having first and second lateral sides, and a plurality of extension pieces having an elongate generally U-shaped channel. The channel has a top leg and a bottom leg, a connector portion extending between the top leg and the bottom leg, and a spike extending outwardly from a rear wall of the connector portion. Additionally, the kit can include a second shelf having a generally concave body. The body has a rear wall, first and second rear lateral walls extending parallel to each other from the rear wall, first and second forward lateral walls connected to first and second rear lateral walls respectively, such that the forward lateral walls are separated from each other by a distance greater than a distance between the first and second rear lateral walls, a front wall connecting forward lateral walls, and a shelf surface defining an internal perimeter of shelf the rear wall, the rear lateral walls, the forward lateral walls, and the front wall.

In yet another embodiment, the present invention provides a removable bracket comprising a generally planar body having a longitudinal side and an adjacent lateral side. The body further has a front face and an opposing rear face. A longitudinal axis extends parallel to the longitudinal side and a lateral axis extends parallel to the lateral side. A first support extends outwardly from the front face and parallel to the lateral axis. The first support has a tab being bendable toward the lateral side. A spike extends outwardly from the rear face.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 14A is a perspective view of an alternative embodiment of a shelf for use with the second exemplary embodiment of the present invention;

FIG. 14B is a perspective view of another alternative embodiment of a shelf for use with the second exemplary embodiment of the present invention;

FIG. 25A is a perspective view of a clevis used with the organization kit shown in FIG. 25;

DETAILED DESCRIPTION OF THE INVENTION

Figure 1:
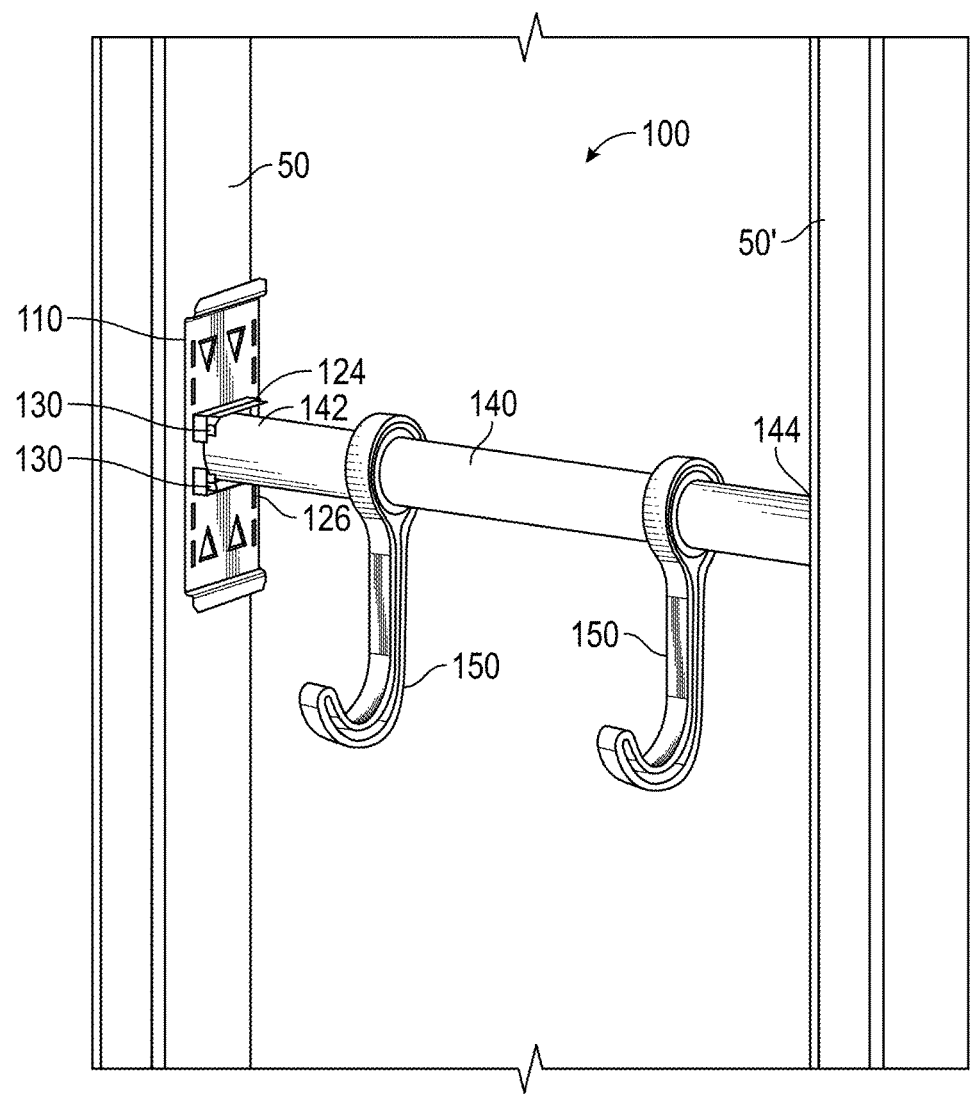
FIG. 1 is a perspective view of an organization kit according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to FIGS. 1-23, an organizer kit 100 according to an exemplary embodiment of the present invention is shown. Organizer kit 100 is used to construct storage assemblies that are secured between studs 50 supporting a wall 52.

Figure 2:
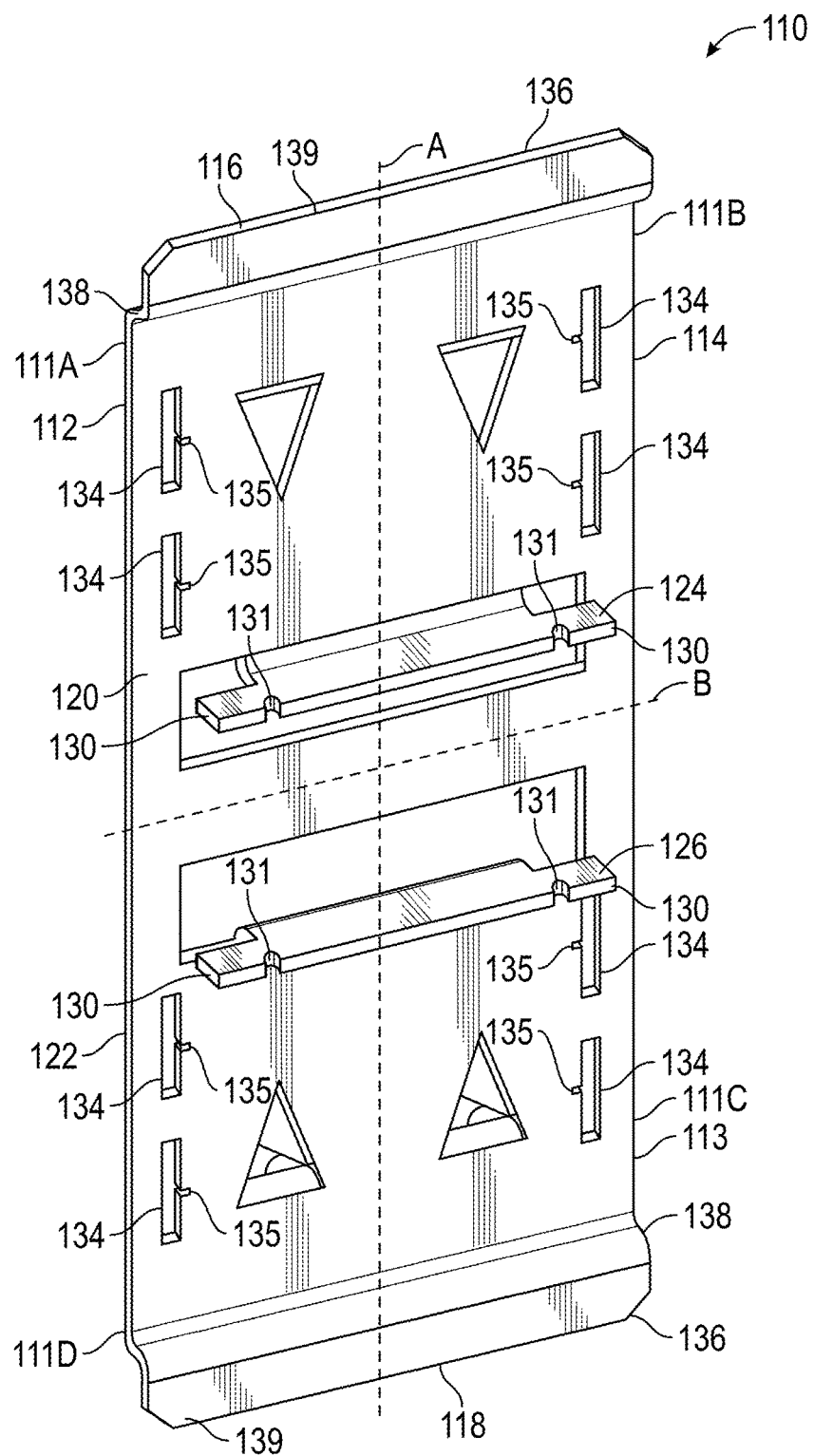
FIG. 2 is a front perspective view of a bracket used with the organization kit shown in FIG. 1.
Figure 3:
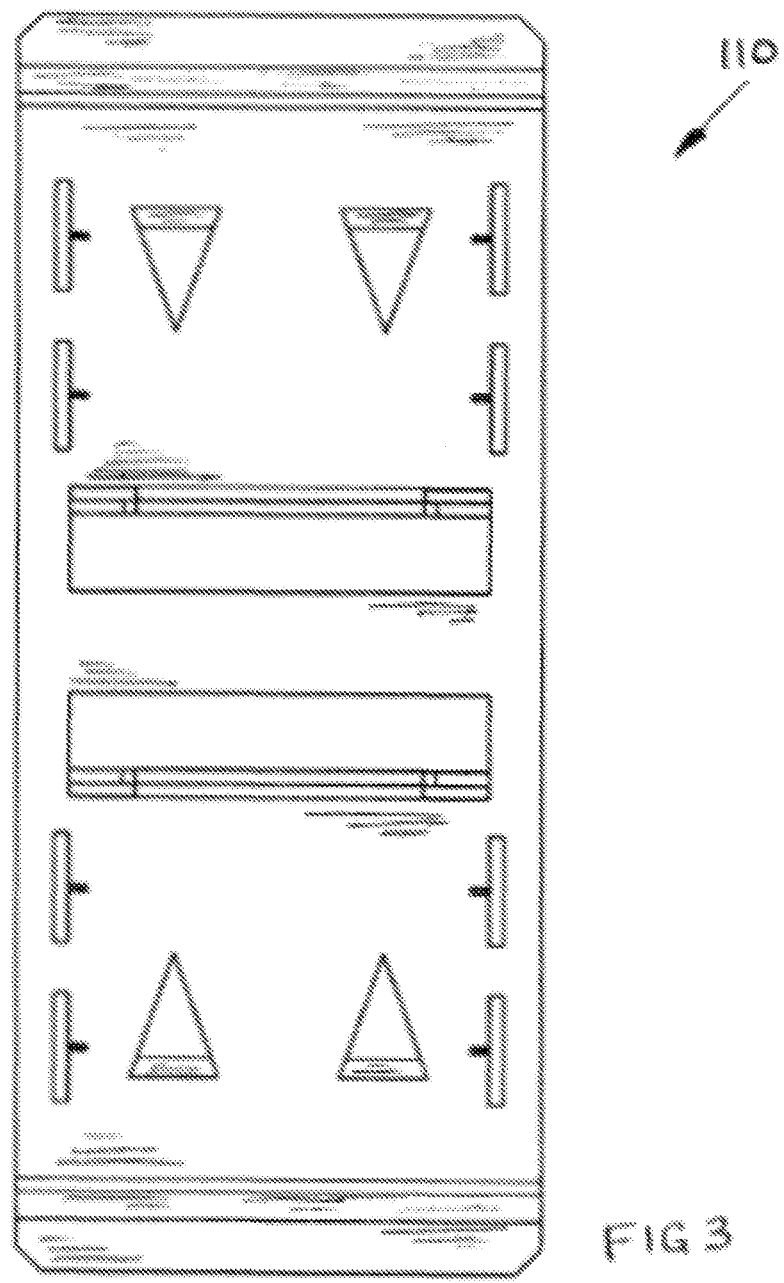
FIG. 3 is a front elevational view of the bracket shown in FIG. 2.

Organizer kit 100 includes a universal wall bracket 110 that is used to support several different storage units. Wall bracket 110 can be manufactured from a stamped metal, such as, for example, 16 gauge galvanized steel. Referring to FIG. 2, wall bracket 110 is symmetric about a longitudinal axis "A" as well as a lateral axis "B". Axes "A" and "B" divide bracket 110 into four quadrants 111A, 111B, 111C, and 111D. Such symmetry allows bracket 110 to be installed on wall studs 50, without regard to a "top" or a "bottom" and of bracket 110.

Bracket 110 is a generally planar rectangular body 113 having a first longitudinal side 112 and a second longitudinal side 114, parallel to first longitudinal side 112 and to longitudinal axis "A". Additionally, bracket has a first lateral side 116 extending between first longitudinal side 112 and second longitudinal side 114, and a second lateral side 118, parallel to first lateral side 116 and to lateral axis "B", and extending between first longitudinal side 112 and second longitudinal side 114. Axes "A" and "B" each bisect body 113. Bracket 110 also has a front face 120 and a rear face 122. In an exemplary embodiment, bracket 110 has a width of about 2½ inches and a length of about 6 inches.

Bracket 110 includes a pair of outwardly extending supports 124, 126 that extend generally perpendicularly outwardly from front face 120 proximate to and on either side of lateral axis "B". Supports 124, 126 are spaced sufficiently apart from each other to enable an elongate rod 140 (shown in FIG. 1), a small shelf 160 (shown in FIG. 14), or a large shelf 170 (shown in FIGS. 15 and 23) be inserted and received therebetween. Each support 124, 126 includes a tab 130 and a notch 131 extending toward each of first longitudinal side 112 and second longitudinal side 114. Each quadrant 111A, 111B, 111C, and 111D includes a tab 130 and notch 131. Tabs 130 can be selectively bent toward lateral axis "B", such as by pliers, at respective notches 131 after rod 140 has been inserted between support 124, 126, as shown FIG. 1, to retain rod 140 between supports 124, 126. Notches 131 dictate approximately where tab 130 bends. The body of the bracket comprises first, second, and third coplanar portions. The first portion extends between the pair of supports 124, 126. The second portion extends upwardly from the support 124, away from the first portion, and to the first lateral side 116. The third portion extends downwardly from the support 126, away from the first portion, and to the second lateral side 118.

Figure 4:
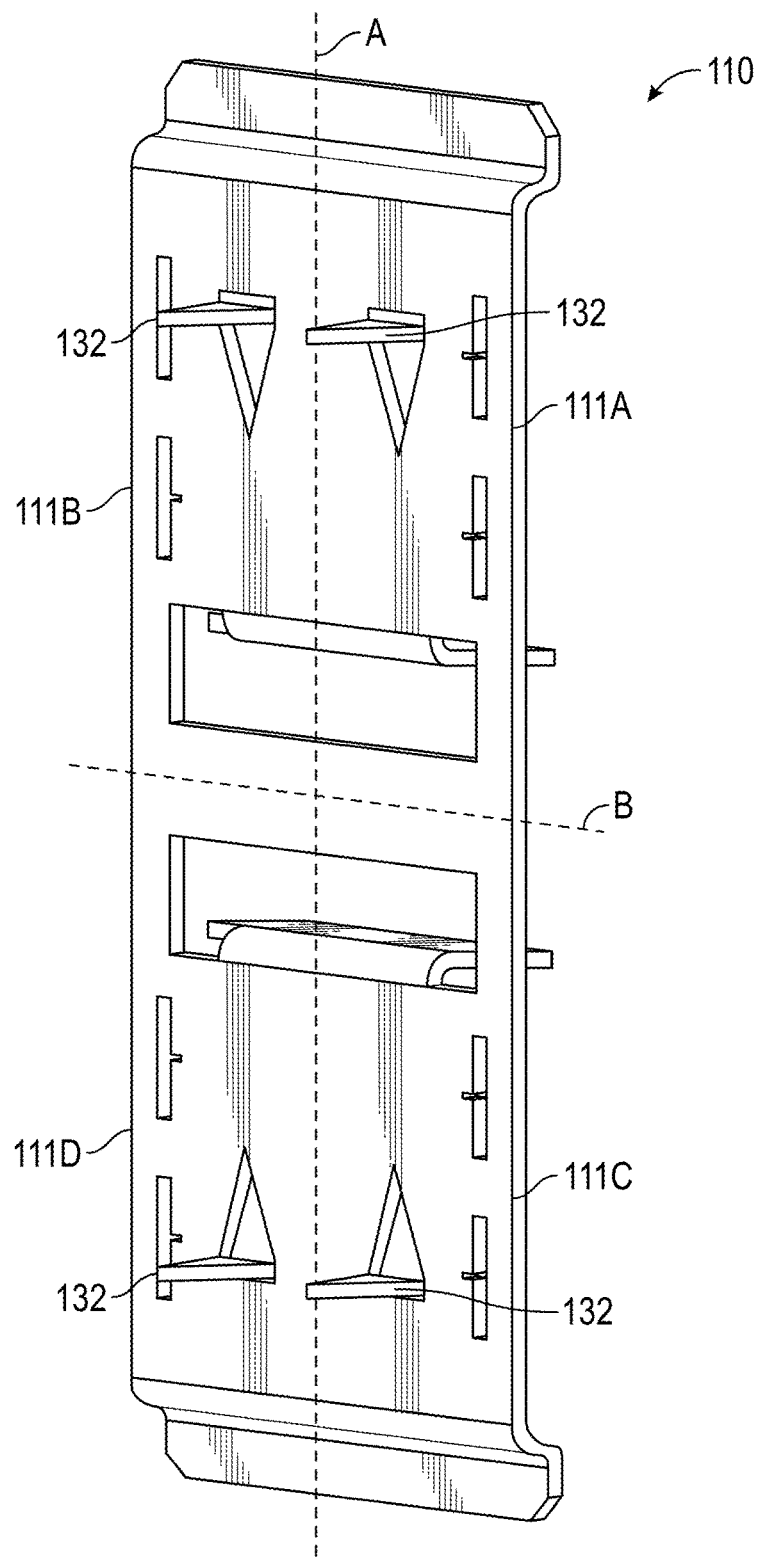
FIG. 4 is a rear perspective view of the bracket shown in FIG. 2.
Figure 5:
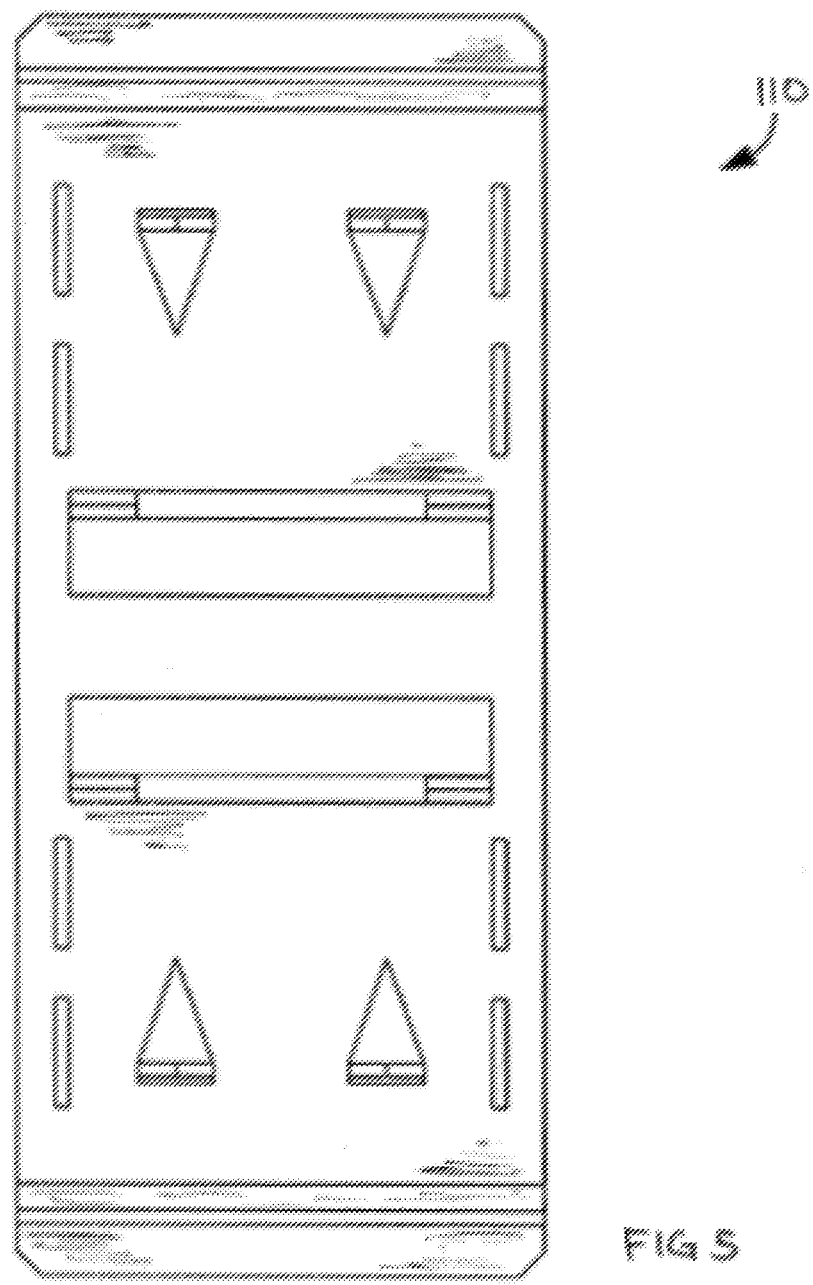
FIG. 5 is a rear elevational view of the bracket shown in FIG. 2.
Figure 6:
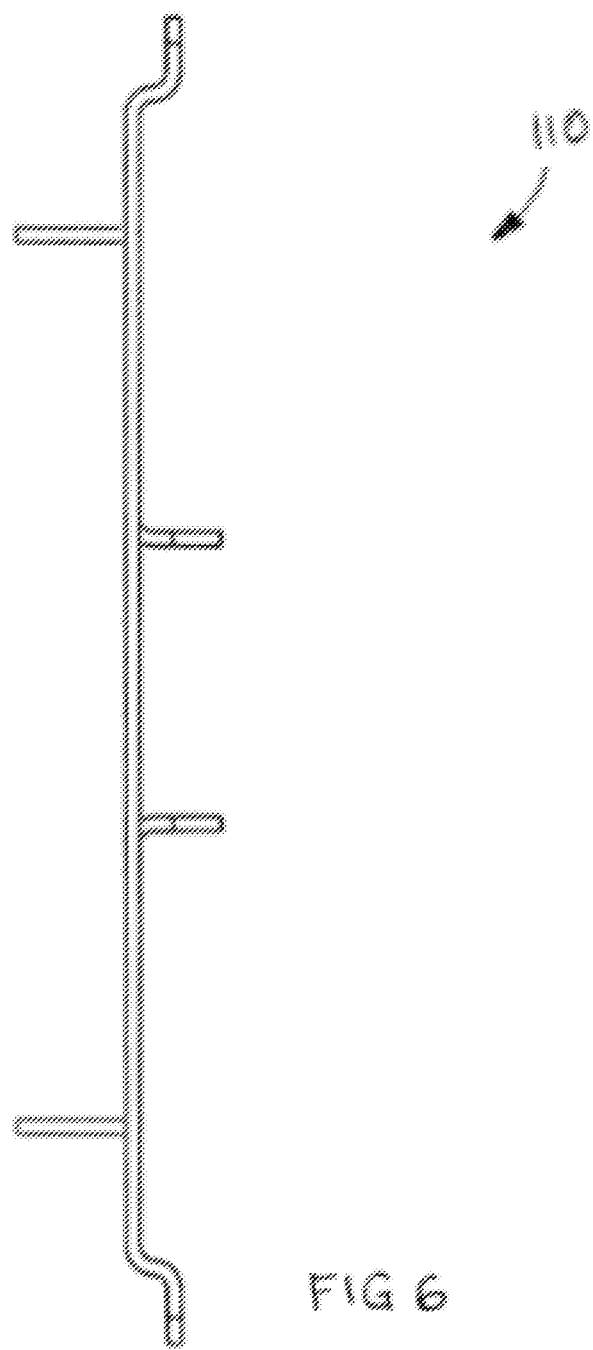
FIG. 6 is a left side elevational view of the bracket shown in FIG. 2, the right side elevational view being a mirror image thereof.
Figure 7:
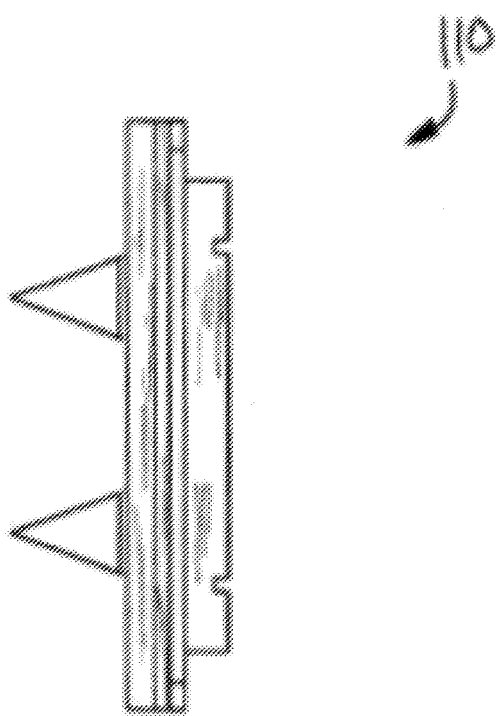
FIG. 7 is a top plan view of the bracket shown in FIG. 2, the bottom plan view being identical.
Figure 8:
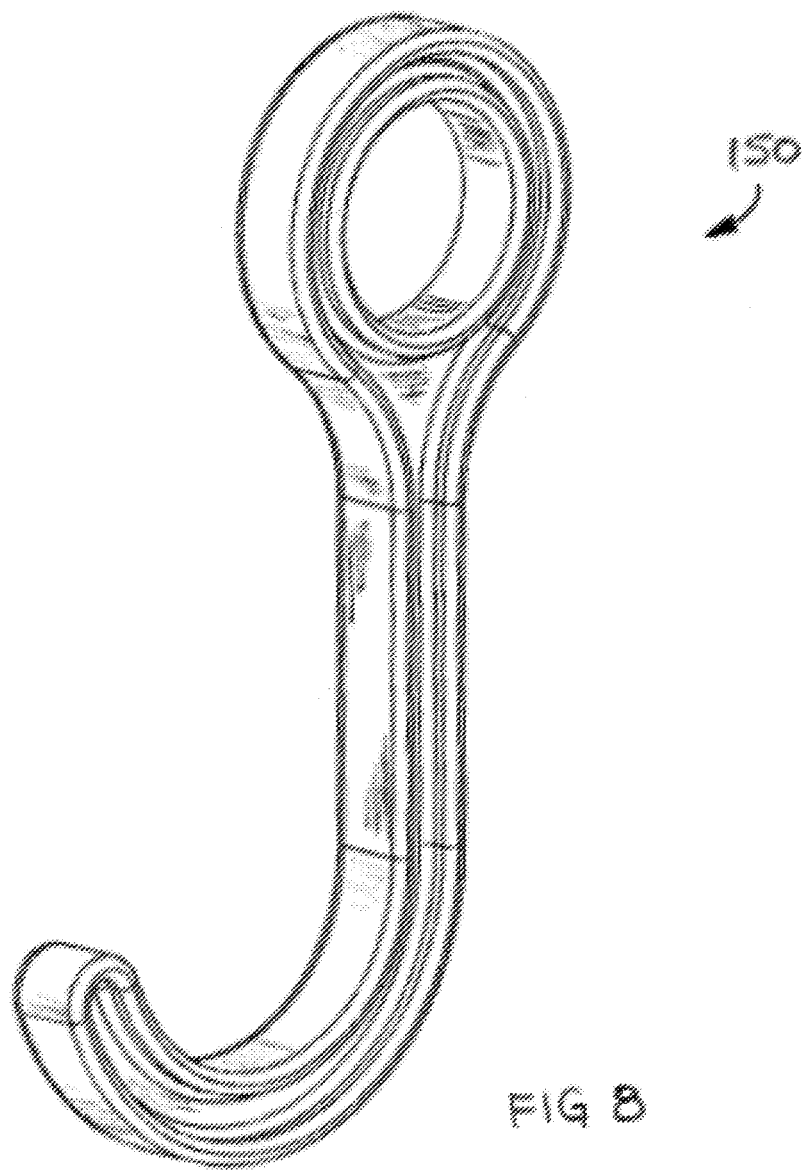
FIG. 8 is a perspective view of a hook used with the organization kit shown in FIG. 1.
Figure 9:
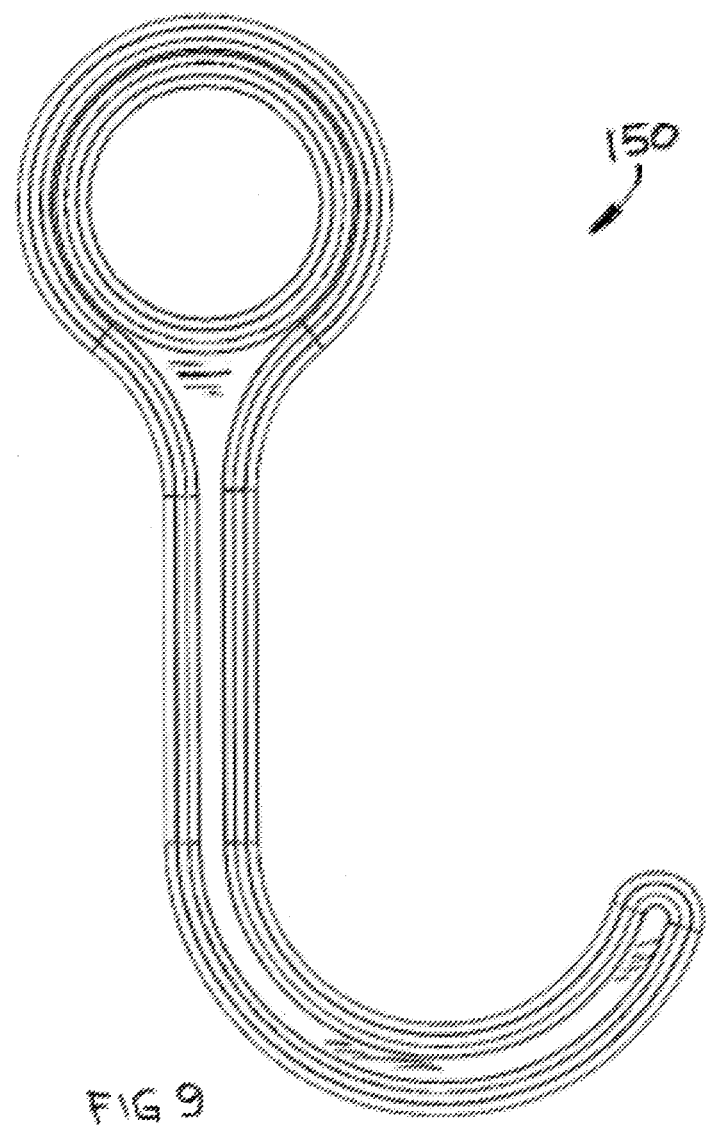
FIG. 9 is a front elevation view of the hook shown in FIG. 8, the rear elevation view being a mirror image thereof.
Figure 10:
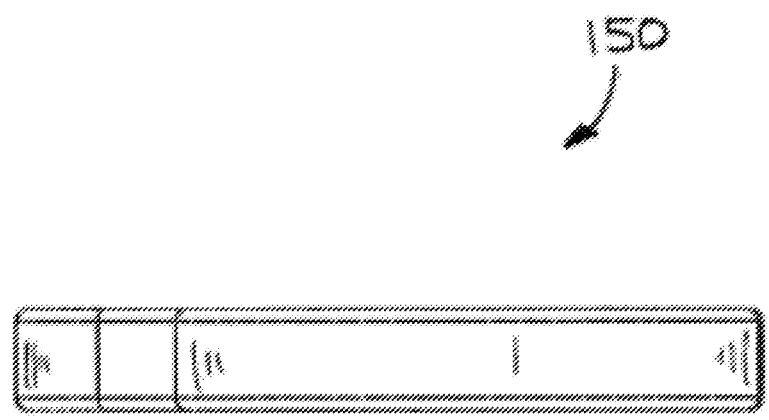
FIG. 10 is a top plan view of the hook shown in FIG. 8.
Figure 11:
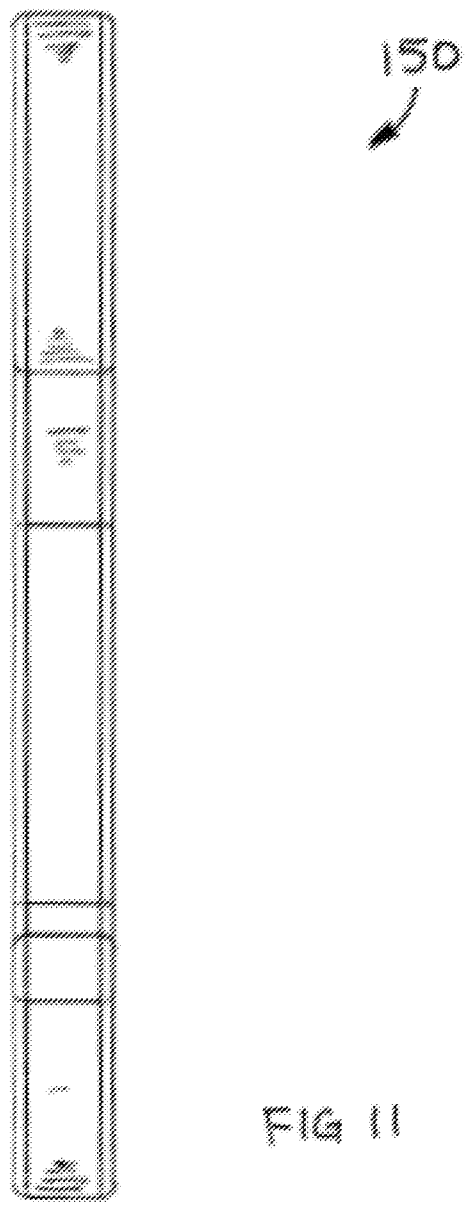
FIG. 11 is a left elevation view of the hook shown in FIG. 8.
Figure 12:
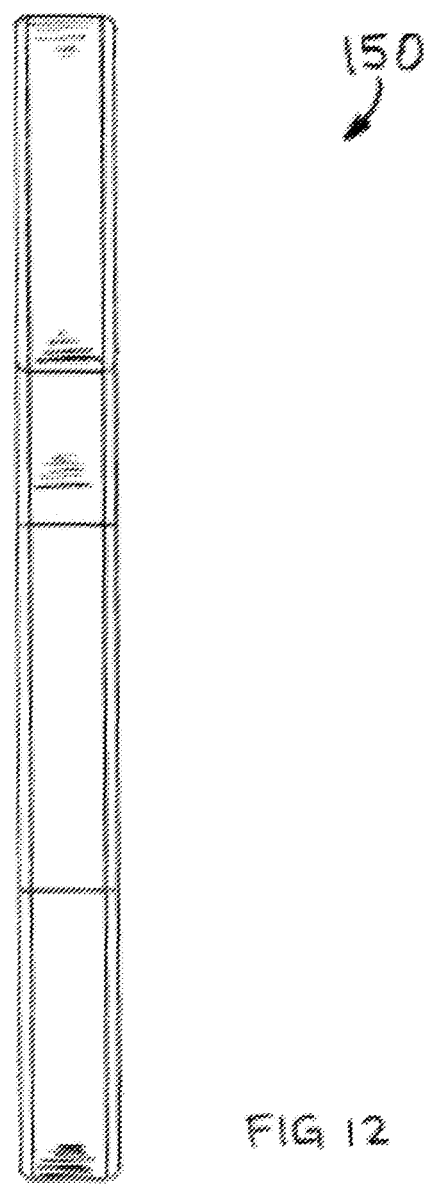
FIG. 12 is a right elevation view of the hook shown in FIG. 8.
Figure 13:
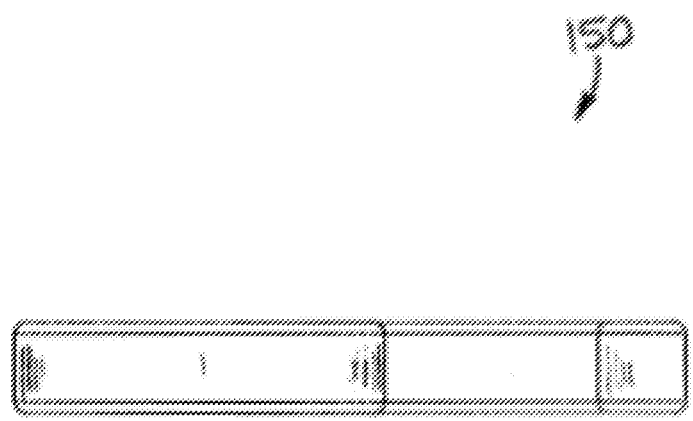
FIG. 13 is a top plan view of the hook shown in FIG. 8.

As shown FIG. 4, each quadrant 111A, 111B, 111C, and 111D includes a triangular spike 132 that extends outwardly from rear face 122. Spikes 132 are driven into wall studs 50 to releasably secure bracket 110 onto wall stud 50. Optionally, although not shown, spikes 132 can extend at an angle of about 80 degrees with respect to rear face 122 toward lateral axis "B".

Each quadrant 111A, 111B, 111C, and 111D also includes a pair of closely spaced longitudinally extending slots 134 extending through body 113. Four slots 134 extend generally co-linearly proximate to first longitudinal side 112 and the remaining four slots 134 extend generally co-linearly proximate to second longitudinal side 114. Slots 134 are used to releasably secure an extension piece 190 for use with for use with large shelf 170, as shown FIGS. 21 and 22. Alignment tabs 135 are formed on front face 120 at a location that is about half the length of each slot 134 and extend from each slot 134 toward longitudinal axis "A". Alignment tabs 135 are used to assist in aligning spikes 199 on extension pieces 190 as will be described later herein.

Each of first lateral side 116 and second lateral side 118 includes a lip 136 extending outwardly from front face 120. Each lip 136 includes an offset length 138 extending generally perpendicularly to front face 120 between first longitudinal side 112 and second longitudinal side 114. A pry face 139 extends from offset length 138 generally parallel to front face 120 and away from body 113. When bracket 110 is installed on wall stud 50, offset length 138 maintains pry face 139 sufficiently far away from wall stud 50 to enable a pry bar, flathead screwdriver, or other tool (not shown) to be inserted between pry face 139 and wall stud 50 and used to pry spikes 132 out of wall stud 50, enabling bracket 110 to be removed from wall stud 50 and reused in another location.

As discussed above, bracket 110 is removably attached to wall stud 50 by driving spikes 132 into wall stud 50, such as, for example, with a hammer. Screwdrivers or drills are not required to install bracket 110 into stud 50. As further discussed above, rod 140 (shown in FIG. 1), small shelf 160 (shown in FIG. 14), or large shelf 170 (shown in FIGS. 15 and 23) can be used with bracket 110. Kit 100 typically includes at least two brackets 110. As shown in FIG. 1, bracket 110 is attached to stud 50. Similarly, a second bracket 110 (not shown) is attached to stud 50'.

Studs 50, 50' are typically spaced apart from each other 16 inches on center. If studs 50, 50' are standard two by fours or two by threes, then spacing between studs 50, 50' is about 14½ inches. To accommodate such spacings, kit 100 can include rod 140 having a length of about 14¼ inches. Rod 140 has a first end 142 and a second end 144, distal from first end 142. Further, rod 140 has an outer diameter slightly less than the spacing between support 124 and support 126 so that rod 140 can be easily slid between support 124 and support 126.

Alternatively, for some construction, studs 50, 50' may be spaced apart from each other 24 inches on center, resulting in spacing between studs 50, 50' to be about 22½ inches. To accommodate such a length, kit 100 can include rod 140 having a length of about 22¼ inches. A 22¼ inch rod 140 may include markings a 14¼ inch location from an end of rod 142 to allow a user to cut rod 40 down to a 14¼ inch length.

Two brackets 110 are installed in studs 50, 50', respectively, such that lateral axes "B" of the two brackets 110 are generally in a horizontal plane. Optionally, hooks 150, part of kit 100, may be slid over an end 142, 144 of rod 140 and suspended from rod 140 as shown FIG. 1. Detailed figures of exemplary hooks 150 are shown FIGS. 5-10.

End 142 of rod 140 is inserted between supports 124, 126 on bracket 110 attached to stud 50 and end 144 of rod 140 is inserted between supports 124, 126 on bracket 110 attached to stud 50'.

Tabs 130 on each of supports 124, 126 farthest from wall 52 are bent toward lateral axis "B", releasably securing rod 140 to both brackets 110. Such bending can be performed using a tool, such as a hammer or pliers. Optionally, although not required, tabs 130 on each of supports 124, 126 closest to wall 52 may also be bent toward lateral axis "B" to prevent rod 140 from being pushed too close to wall 52. However, bracket 110 is sufficiently wide enough and mounted close enough to wall 52 such that rod 140 cannot slide between supports 124, 126 and wall 52 and fall off bracket 110. If it is desired to remove rod 140 from between studs 50, 50' for any reason, a user can use a hand tool to pry tabs 130 away from lateral axis "B", such as with pliers.

Figure 14:
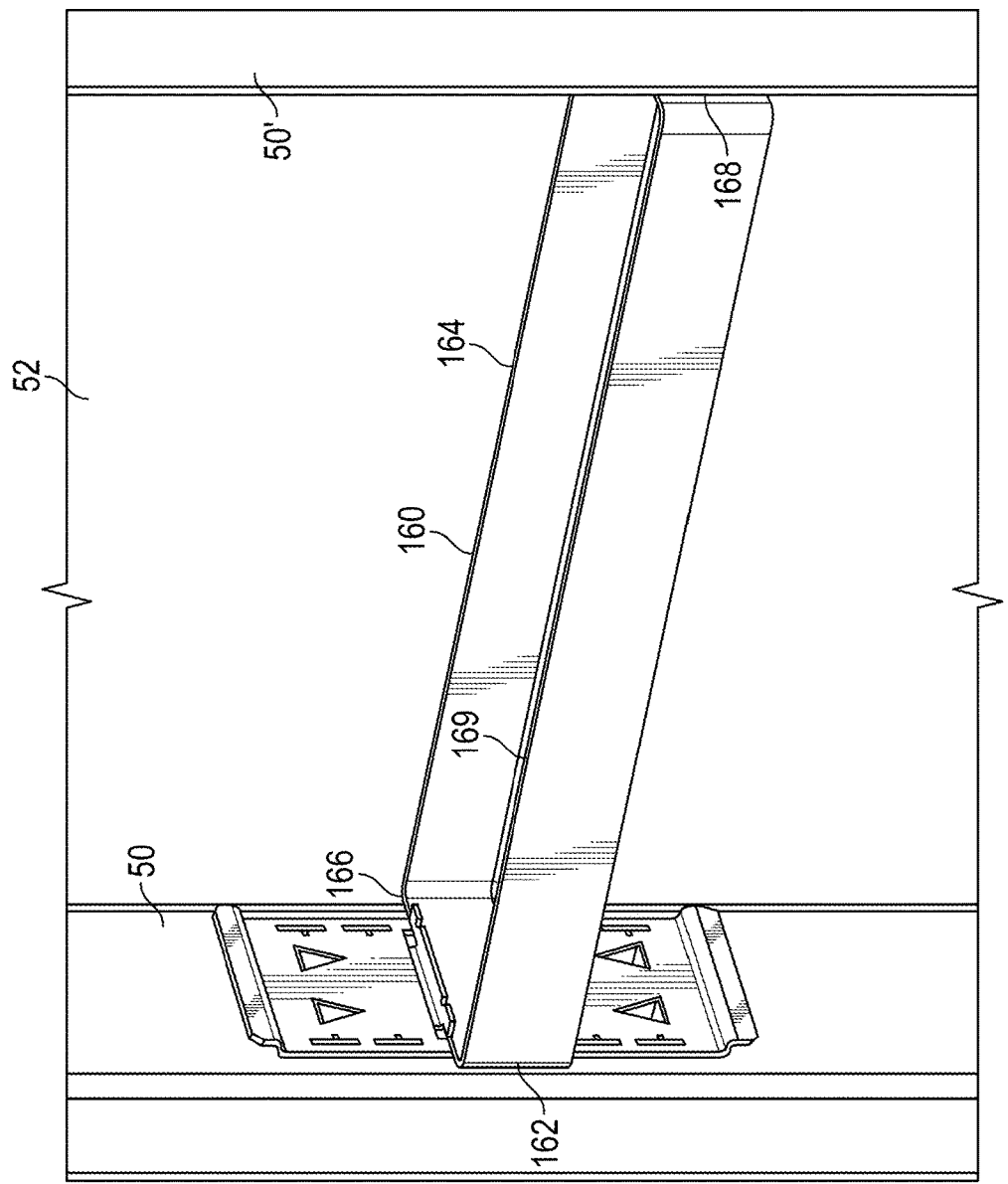
FIG. 14 is a perspective view of an organization kit according to a second exemplary embodiment of the present invention.

Alternatively, instead of using brackets 110 to support rod 140, brackets 110 can be used to support small shelf 160, small shelf 160 being a part of kit 100, as shown FIG. 14. Shelf 160 is an elongated concave container having opposing longitudinal sides 162, 164 connected by opposing lateral sides 166, 168 and having a generally flat bottom 169 extending within a perimeter defined by longitudinal sides. 162, 164, and lateral sides. 166, 168.

Longitudinal sides 162, 164 have a length of slightly less than about 14½ inches so that shelf 160 can easily slide between studs 50, 50'. Lateral sides 166, 168 each have a length that is about 3½ inches long (approximately the width of a standard 2×4 stud) and a height that is slightly less than the distance between supports 124, 126 of bracket 110 so that shelf 160 can be easily slid between supports 124, 126. Alternatively, instead of inserting shelf 160 between supports 124, 126, shelf 160 can be placed on top of supports 124. In that configuration, the height of lateral sides 166, 168 is not constrained by the distance between supports 124, 126 and can be any height.

Instead of small shelf 160, an alternative embodiment of a small compartmentalized shelf 260, shown in FIG. 14A, can be used with kit 100. Shelf 260 has the same overall dimensions as shelf 160, but also includes a at least one, and preferably, a plurality, of dividing walls 266 that extend between longitudinal walls 262, 264, forming a plurality of compartments 268 between adjacent dividing walls 266. Compartments 268 can be used for storing relatively small items, such as, for example, nails, screws, etc.

Still alternatively, a tool holding shelf 360, shown in FIG. 14B, can be used instead of either small shelf 160 or compartmentalized shelf 260. Tool holding shelf 360 includes at least one, and preferably a plurality, of through-openings 368 extending through a bottom 369. Through-openings 368 are sufficiently large to allow the shaft of a screwdriver (not shown) to extend through, but small enough to retain the handle of the screwdriver so that the shaft is supported by bottom 369. Additionally, shelf 360 includes at least one, and preferable a plurality, of side openings 363 extending through the bottom of a forward longitudinal wall 364, as well as through bottom 369. Side openings 363 are sized to allow a wrench (not shown) to be inserted there-through and rotated so that the wrench head can rest on and be supported by bottom 369. Side openings 363 are shown having an arched end on longitudinal wall 364, as well as on bottom 369, although those skilled in the art will recognize that openings 363 can be other shapes as well.

Figure 15:
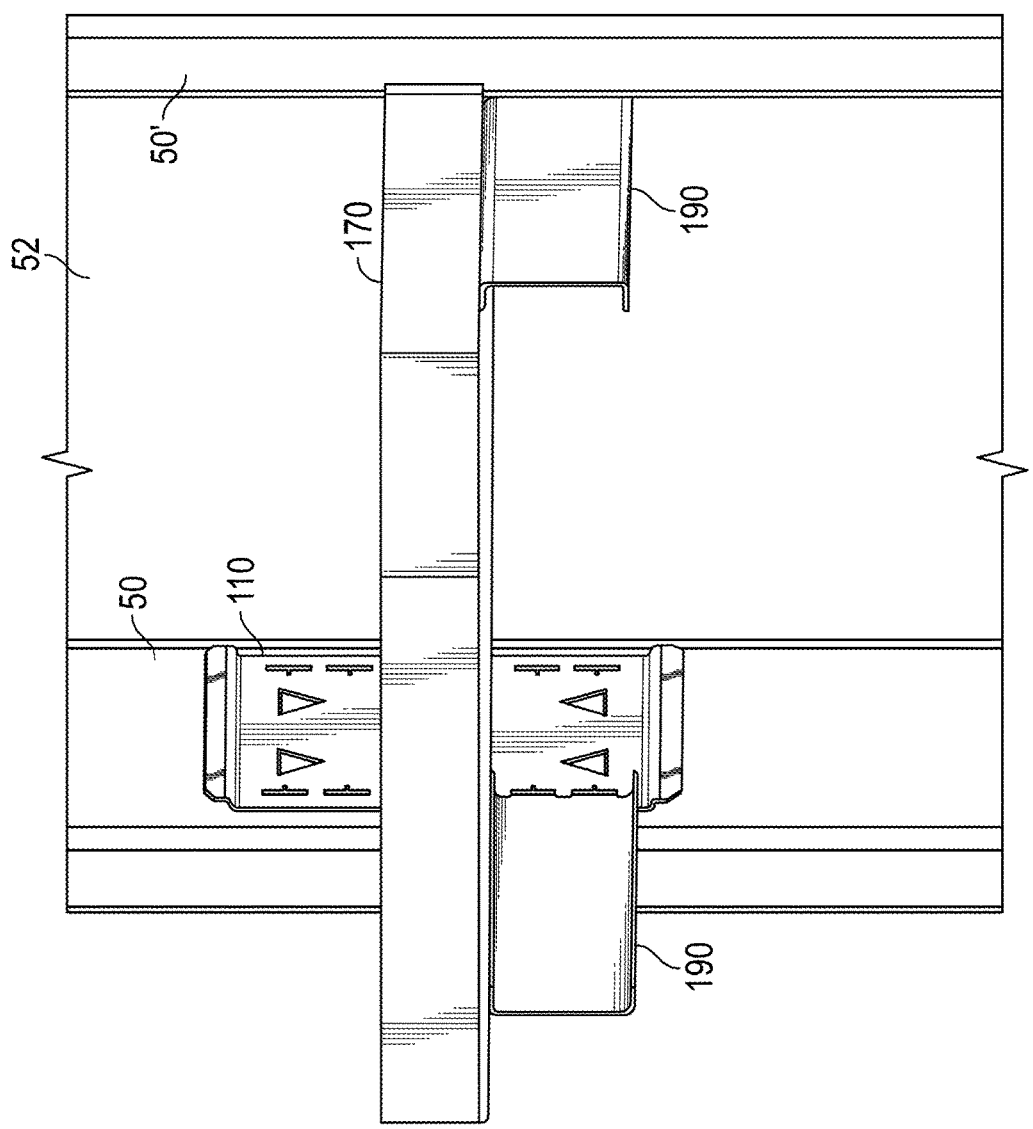
FIG. 15 is a bottom perspective view of an organization kit according to a third exemplary embodiment of the present invention.

Still alternatively, instead of using brackets 110 to support either rod 140, or small shelf 160, 260, 360, brackets 110 can be used to support large shelf 170, as shown in FIG. 15. Although not shown, an alternative embodiment of a large shelf can include compartments, similar to shelf 260, or tool holding openings, similar to shelf 360.

Figure 16:
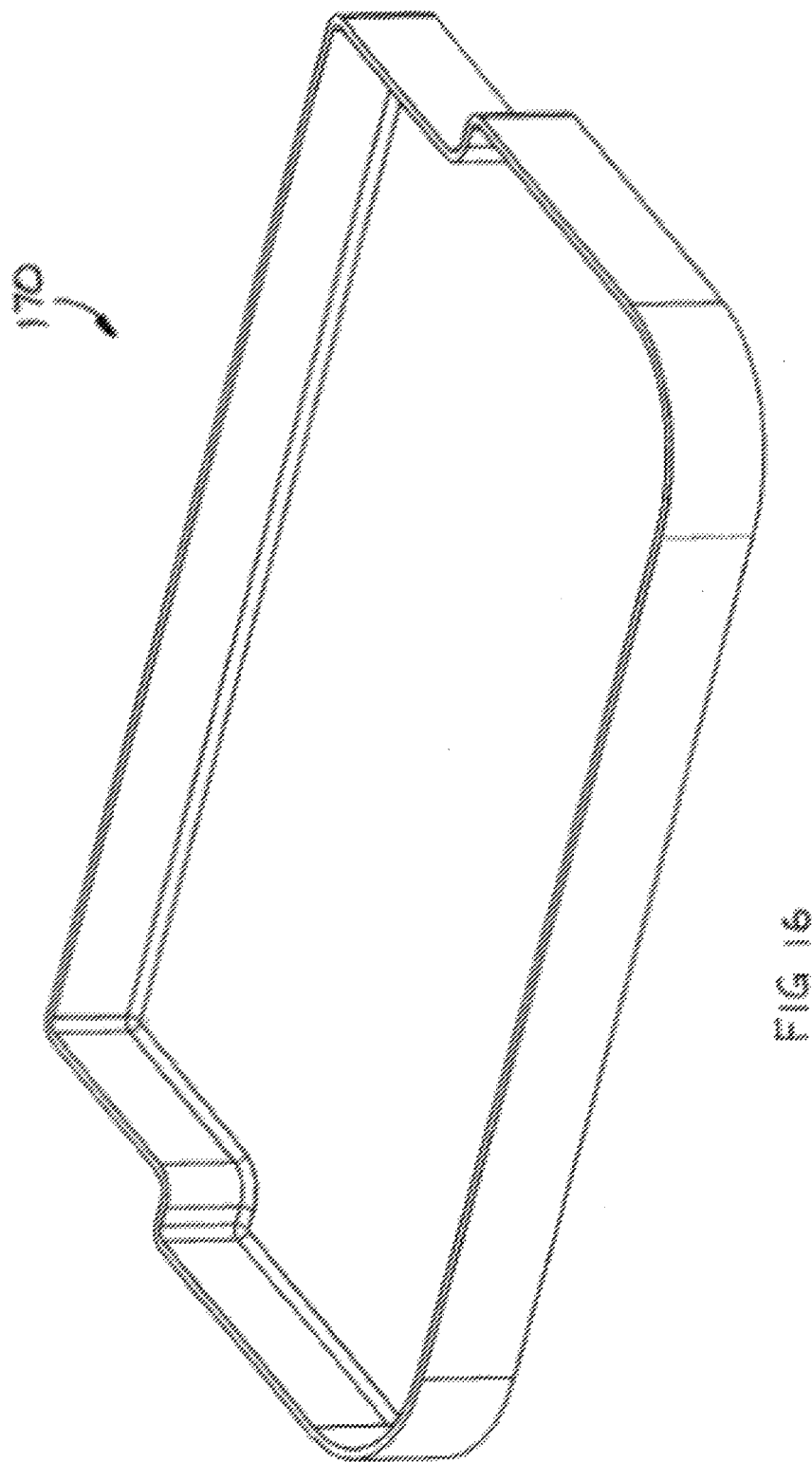
FIG. 16 is a perspective view of a shelf used in the kit shown in FIG. 15.
Figure 17:
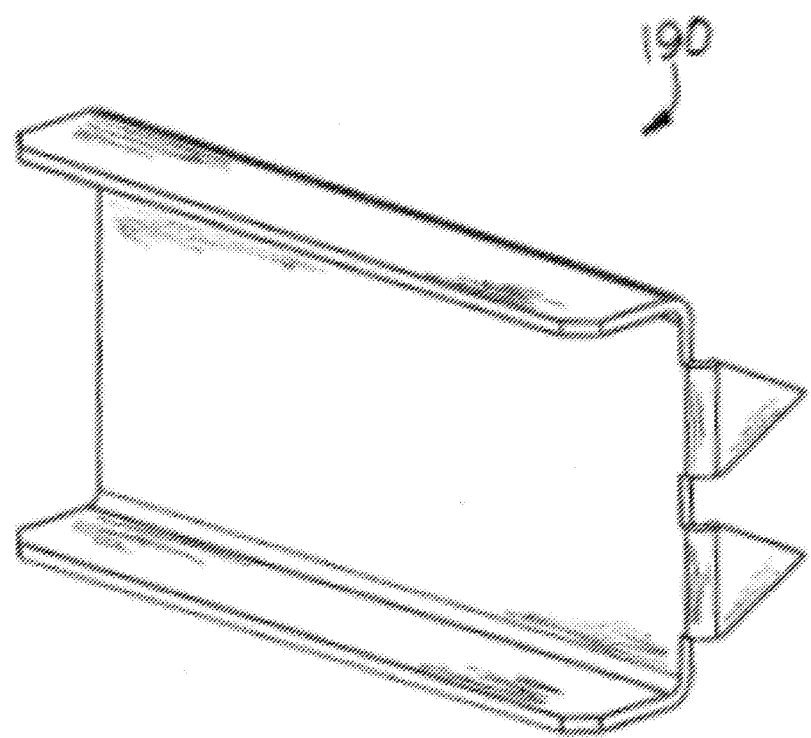
FIG. 17 is a front perspective view of an extension piece used with the kit shown in FIG. 15.
Figure 18:
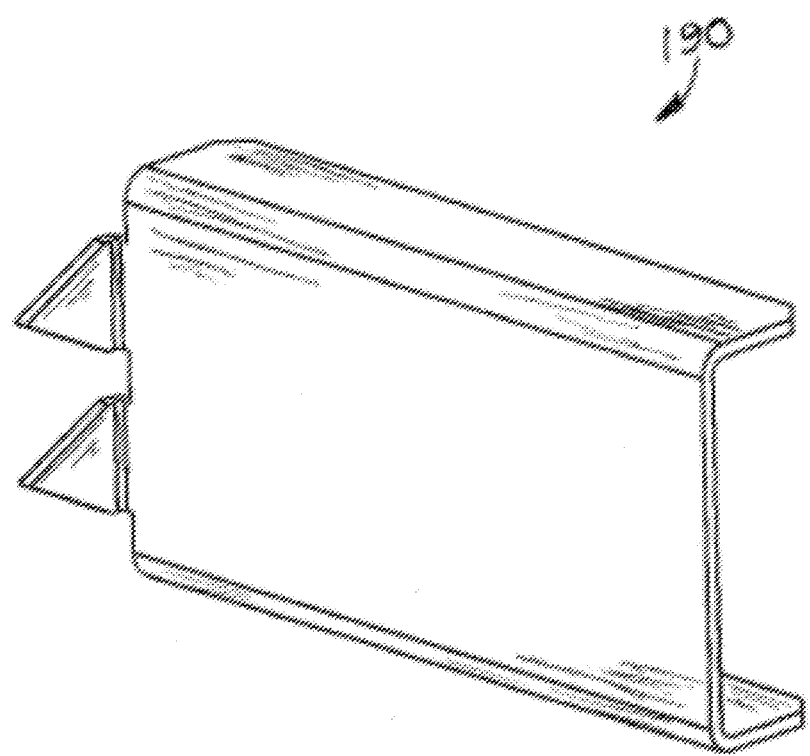
FIG. 18 is a rear perspective view of the extension piece shown in FIG. 17.
Figure 19:
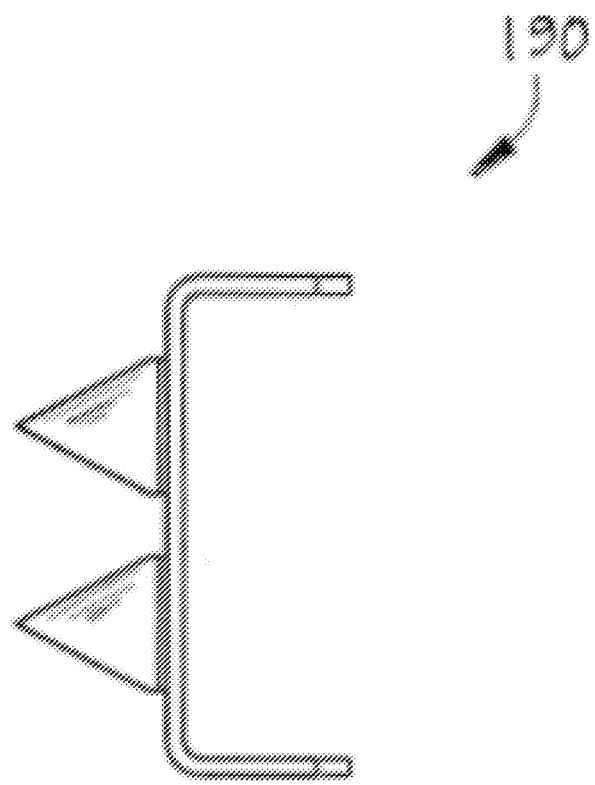
FIG. 19 is a side elevational view of the bracket shown in FIG. 17.
Figure 20:
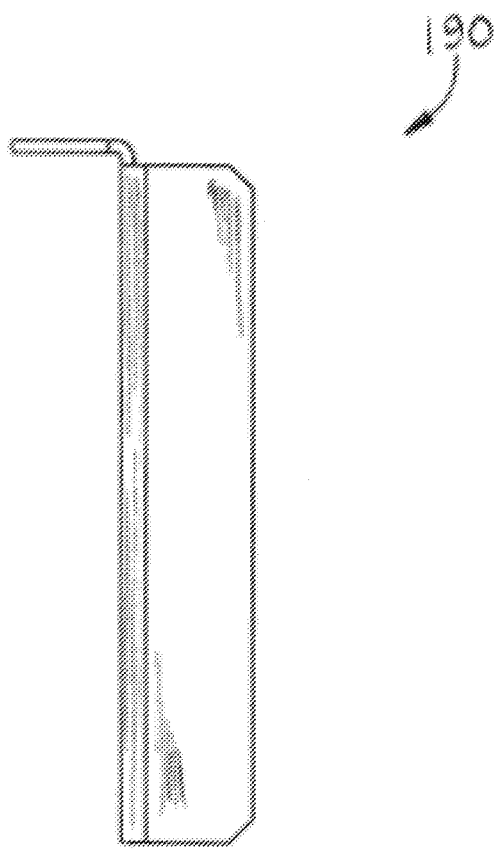
FIG. 20 is a top plan view of the bracket shown in FIG. 17, with the bottom plan view being a mirror image thereof.
Figure 21:
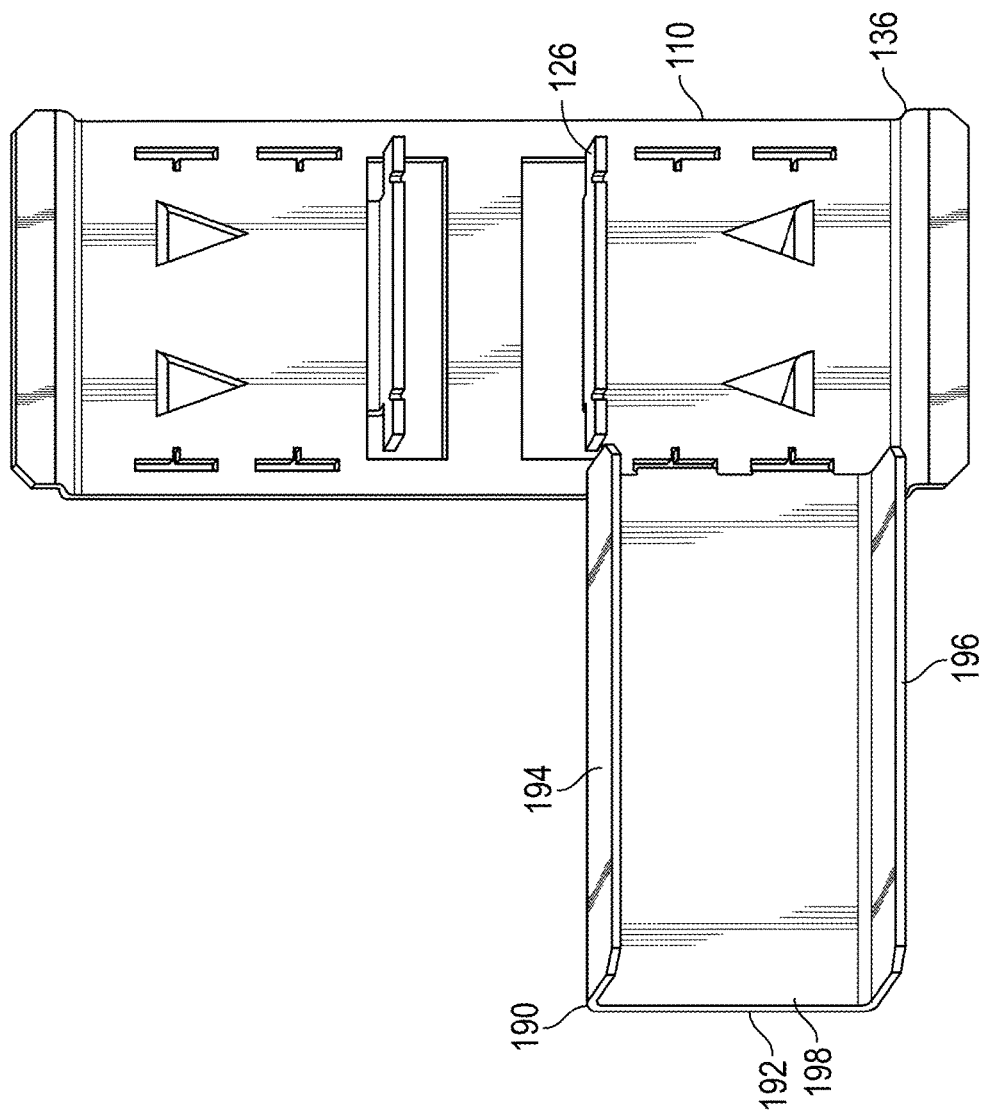
FIG. 21 is a front perspective view of a bracket and extension piece shown in the organization kit of FIG. 15.

As shown in FIG. 15, extension piece 190 is releasably attached to each bracket 110. FIGS. 16 and 17 show extension piece 190 attached to bracket 110 without large shelf 170. Extension piece 190 includes an elongate generally U-shaped channel 192 having a top leg 194 and a bottom leg 196. A connector portion 198 extends between top leg 194 and bottom leg 196. Connector portion 198 spaces top leg 194 from bottom leg 196 approximately the distance between support 126 and lip 136 on bracket 110 such that, when extension piece 190 is connected to bracket 110, a top surface of top leg 194 is generally flush with the top surface of support 126 and a bottom surface of bottom leg 196 rests on lip 136.

Figure 22:
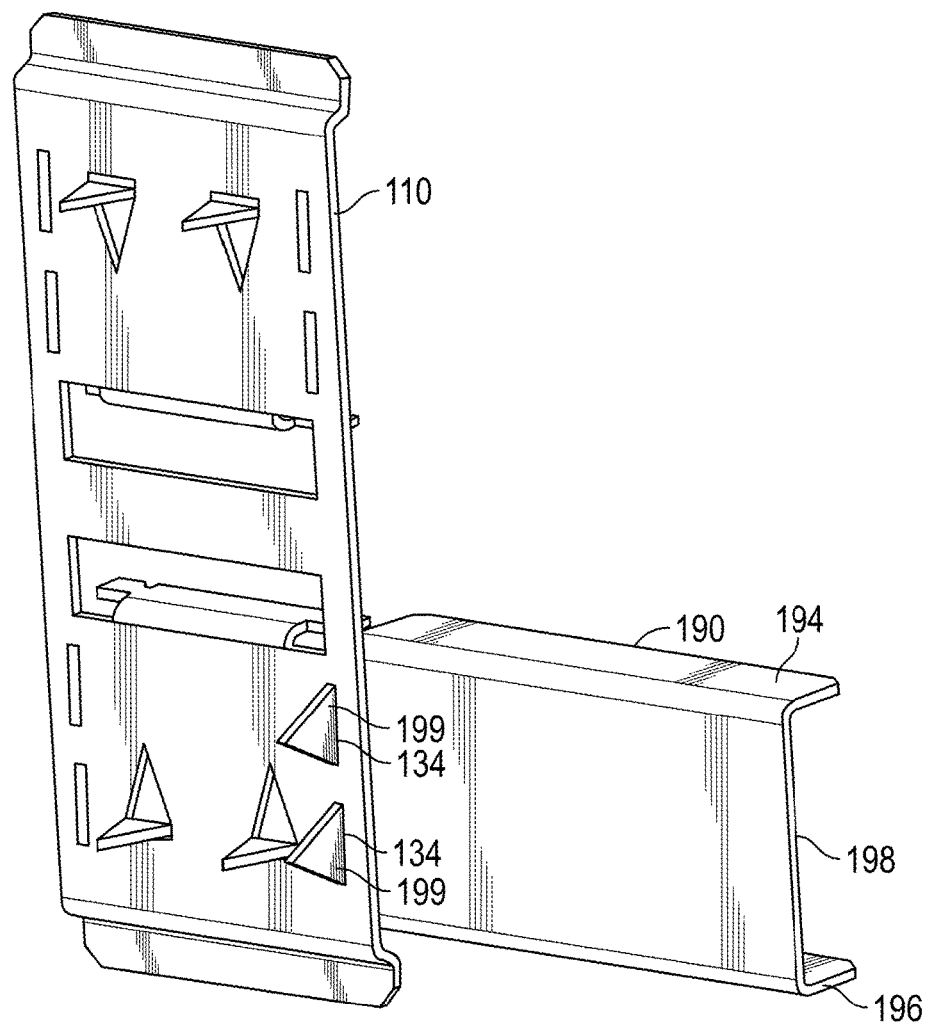
FIG. 22 is a rear perspective view of the bracket and extension piece shown in FIG. 15.
Figure 23:
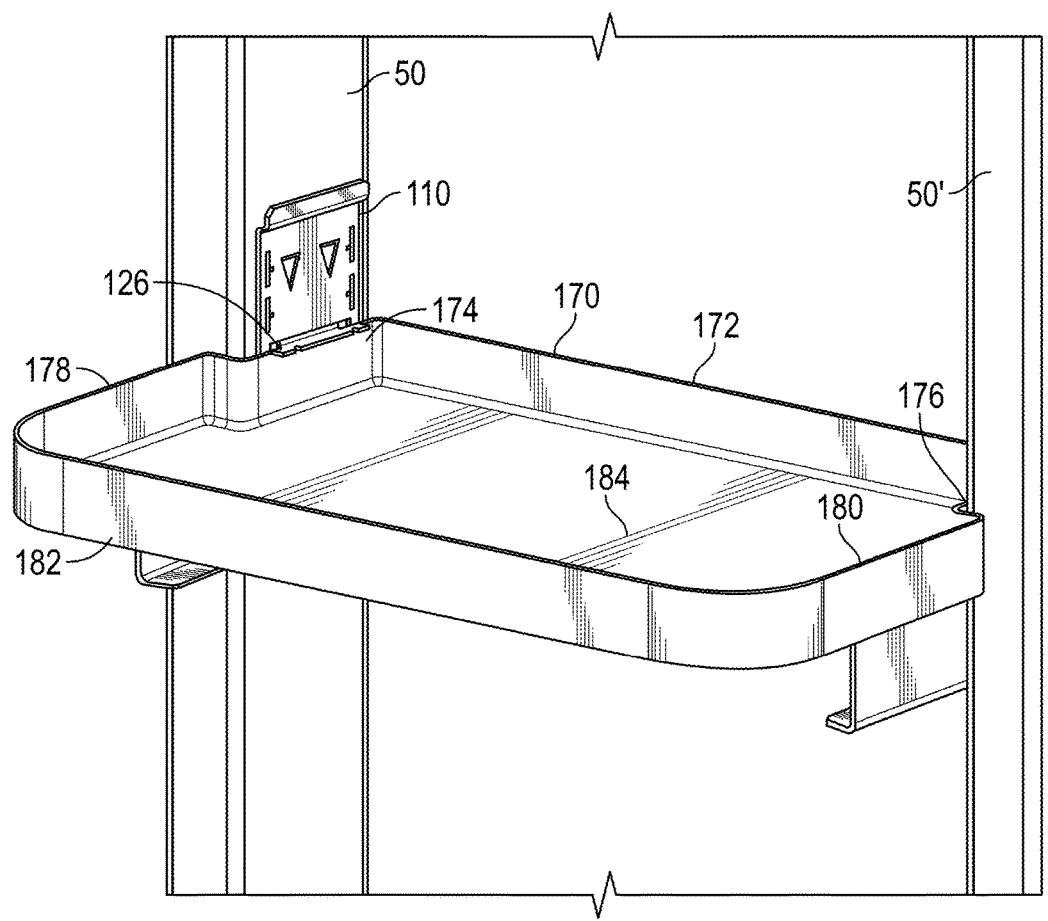
FIG. 23 is a top perspective view of the organization kit shown in FIG. 15.

As shown in FIG. 22, connector portion 198 includes a pair of spikes 199 extending from a rear surface thereof. Spikes 199 are sized and shaped to fit into a pair of slots 134 on bracket 110. Spikes 199 are aligned with alignment tabs 135 and are then driven into stud 150 (see FIG. 15) to support extension piece 190.

Typically, bracket 110 is first installed on stud 50, and then spikes 199 are inserted into slot 134 and extension piece 190 is pounded into stud 50, such as, for example, by hammer (not shown). After extension piece 190 is attached to stud 110, large shelf 170 can be slid over top leg 194 and between supports 124, 126. At least a portion of large shelf 170 that extends beyond studs 50, 50' is supported by extension piece 190, as shown in FIG. 15.

Referring to FIG. 15, large shelf 170 has a generally concave body with a rear wall 172 that has a length of slightly less than 14½ inches, to accommodate the spacing between studs 50, 50'. Rear lateral walls 174, 176 extend parallel to each other from rear wall 172. Rear lateral walls 174, 176 have a height slightly less than the distance between supports 124, 126 so that rear lateral walls 174, 176 can slide between supports 124, 126. Optionally, rear lateral walls 174, 176 have a length of slightly over 3½ inches to extend beyond the width of a standard 2×4 or 2×3 stud. Alternatively, although not shown, rear lateral walls 174, 176 can have a length that defines the entire depth of large shelf 170.

As shown FIG. 16, however, large shelf 170 can include forward lateral walls 178, 180 connected to rear lateral walls 174, 176, respectively, such that forward lateral walls 178, 180 extend outwardly beyond studs 50, 50' are separated from each other by a distance greater than the standard 14½ inch spacing between studs 50, 50'. A front wall 182 connects forward lateral walls 178, 180. A shelf surface 184 defines the internal perimeter of shelf 170 bounded by rear wall 172, rear lateral walls 174, 176, forward lateral walls 178, 180, and front wall 182.

Figure 24:
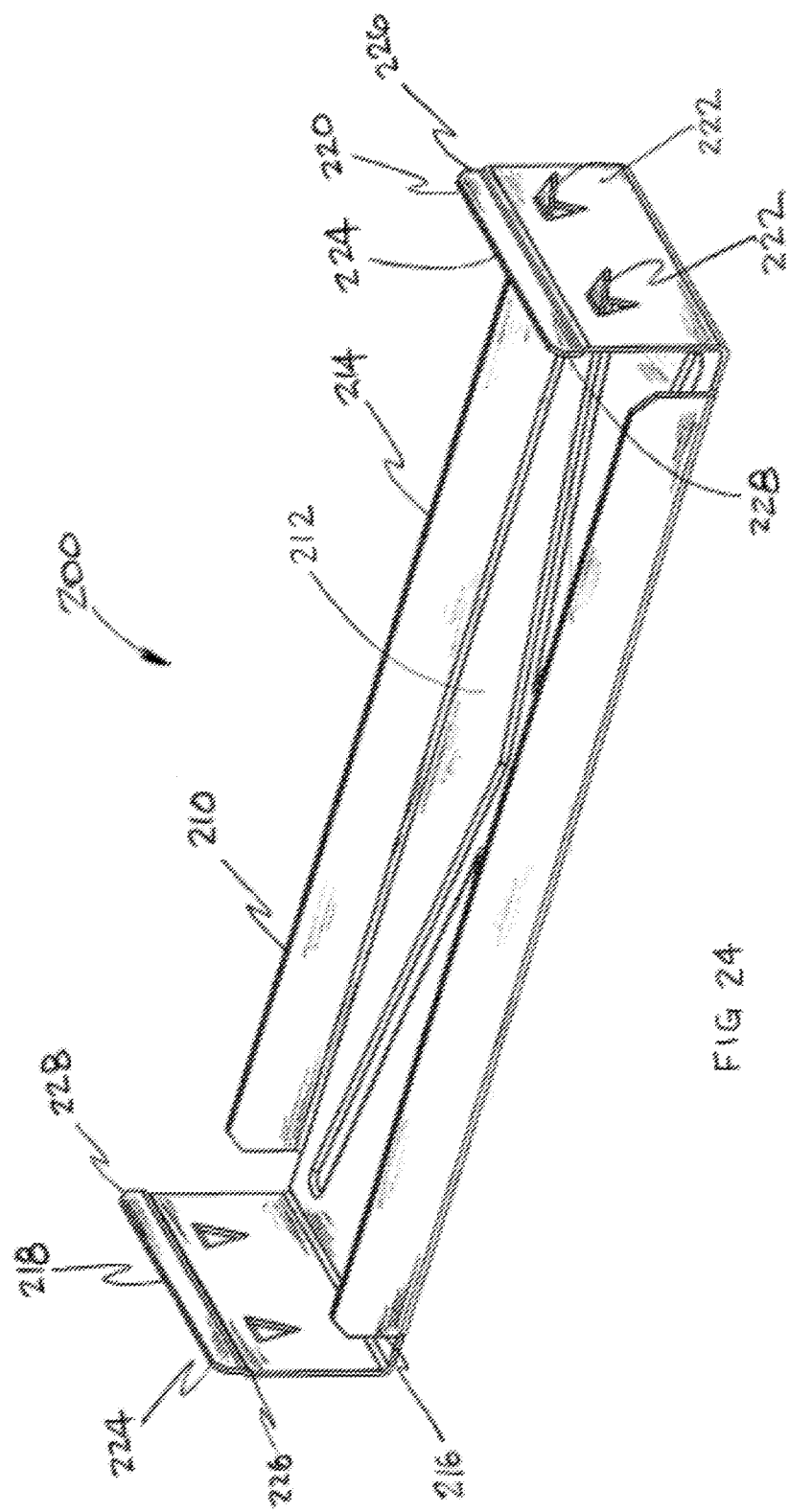
FIG. 24 is a perspective view of a shelf according to a fourth embodiment of the present invention.

An alternative embodiment of an organization kit 200 according to the present invention is shown FIG. 24. Kit 200 comprises a shelf 210 that is releasably attachable between studs 50, 50' (not shown FIG. 24) without the use of bracket 110. Shelf 210 can be fabricated from a single sheet of stamped metal, such as, for example, 16 gauge galvanized steel and bent to form the structure shown in FIG. 24.

Shelf 210 includes a base portion 212 connected to a longitudinal rear wall 214 and a longitudinal front wall 216 extending parallel to rear wall 214. Base portion 212 has a length of about 14½ inches to allow installation of shelf 210 between studs 50, 50'. Optionally, although not shown, an under surface of base portion 212 may include at least one strengthening rib for support.

Base portion 212 is also connected to first and second lateral sidewalls 218, 220, respectively. It is important to note that rear wall 214 and front wall 216 are not connected to sidewalls 218, 220 and that gap is present between each end of rear wall 214 and front wall 216 and sidewalls 218, 220. Sidewalls 218, 220 have a length slightly less than the distance between rear wall 214 and front wall 216 to allow sidewalls 218, 220 to bend inwardly toward each other at the connection between sidewalls 218, 220, and base portion 212.

Each sidewall 218, 220 includes a plurality of spikes 222 extending outwardly therefrom, away from base portion 212. Spikes 222 are used to secure shelf 210 to stud 50, 50', such as by pounding spikes 222 into stud 50, 50' with a hammer.

A top portion of each sidewall 218, 220, above spikes 222, a lip 224 extending inwardly toward the respective other sidewall 220, 218. Each lip 224 includes an offset length 226 extending generally perpendicularly to its respective sidewall 218, 220 between rear longitudinal side 214 and a front longitudinal side 216. A pry face 228 extends from offset length 226 generally parallel to sidewalls 218, 220. When shelf 210 is installed on wall stud 50, offset length 226 maintains pry face 228 sufficiently far away from wall stud 50 to enable a pry bar, flathead screwdriver, or other tool (not shown) to be inserted between pry face 228 and wall stud 50 and used to pry spikes 222 out of wall stud 50, enabling shelf 210 to be removed from wall stud 50 and reused in another location.

To install shelf 218 between wall studs 50, 50', sidewalls 218, 220 are bent generally inward toward each other sufficiently to allow shelf 210, with spikes 222 protruding outwardly from each lateral side 218, 220 to fit between studs 50, 50'. Sidewalls 218, 220 are then pounded with a tool, such as, for example, a hammer, to drive spikes 222 into stud 50, 50'.

Figure 25:
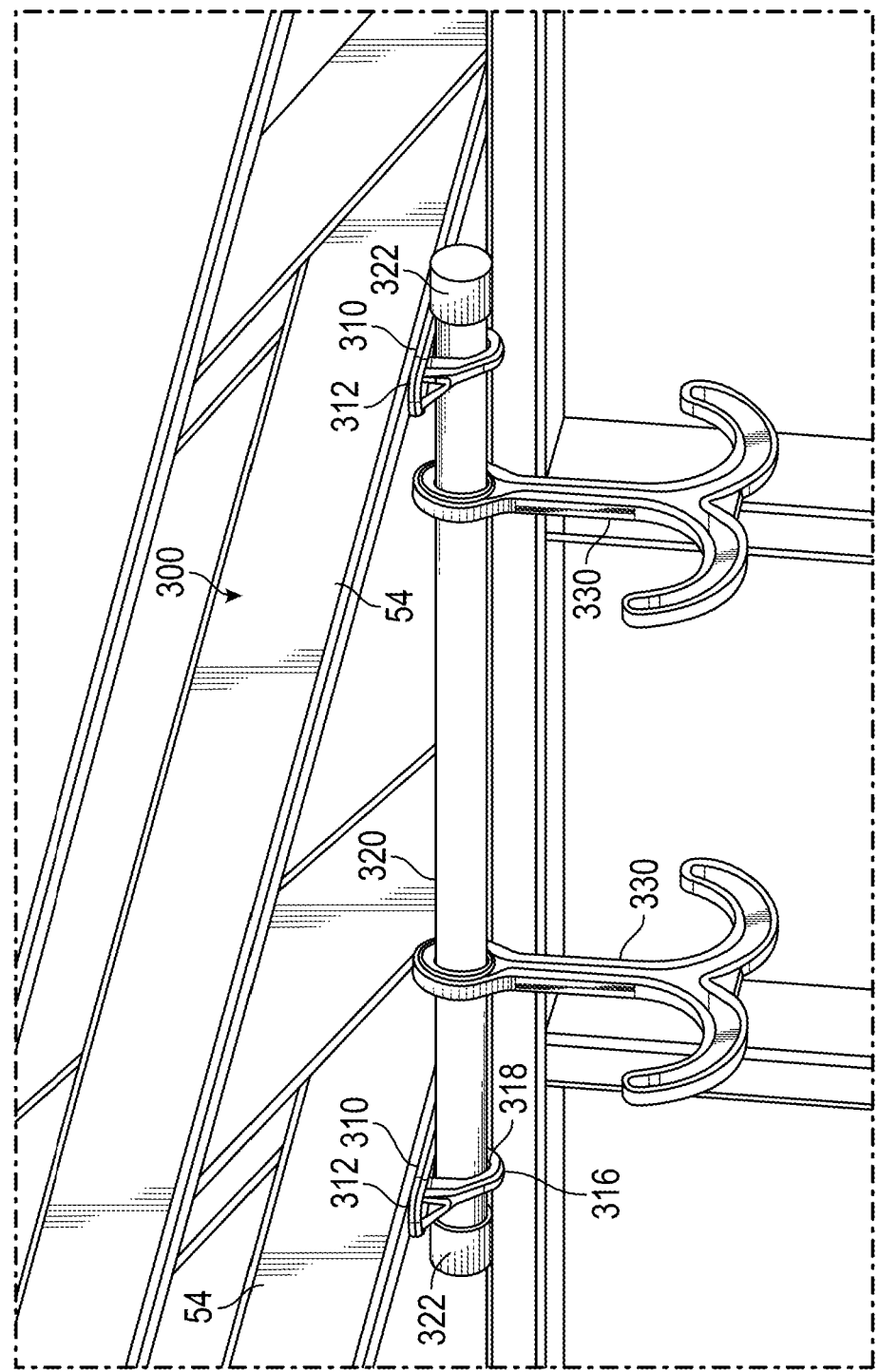
FIG. 25 is a perspective view of an organization kit according to a fifth embodiment of the present invention.
Figure 26:
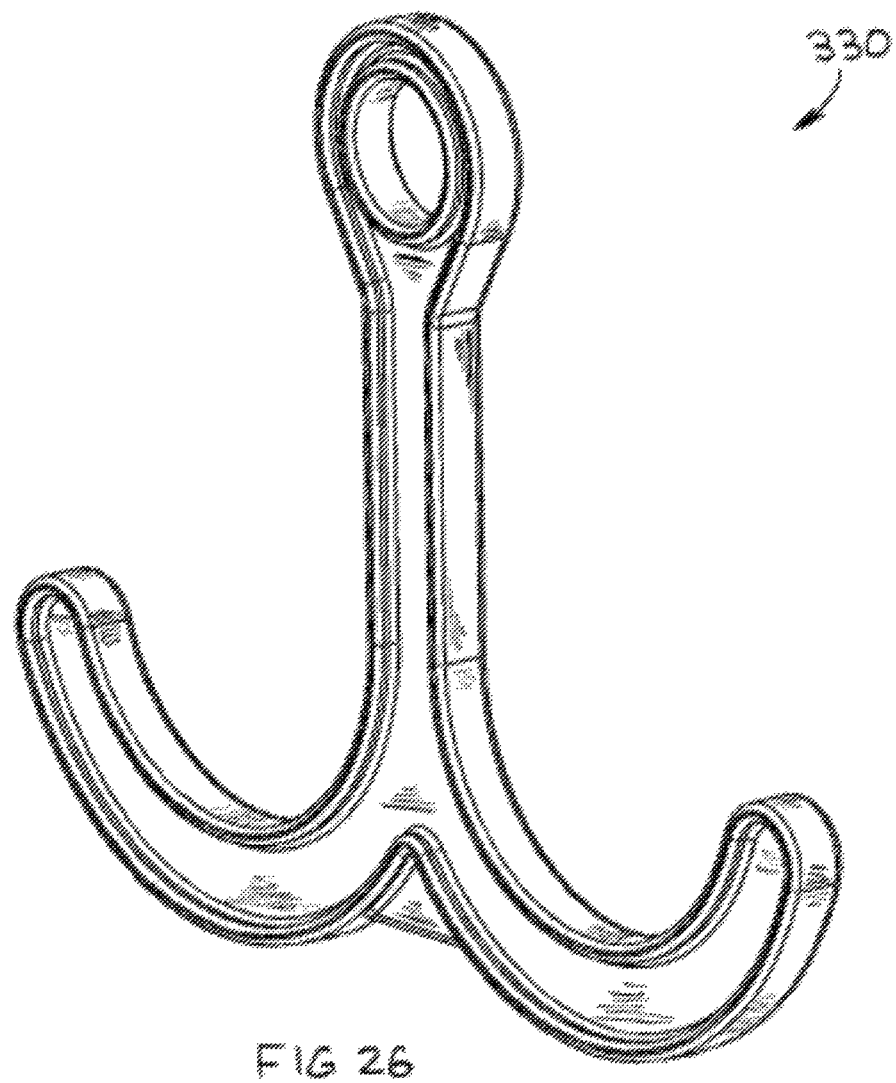
FIG. 26 is a perspective view of a hook used with the organization kit shown in FIG. 25.
Figure 27:
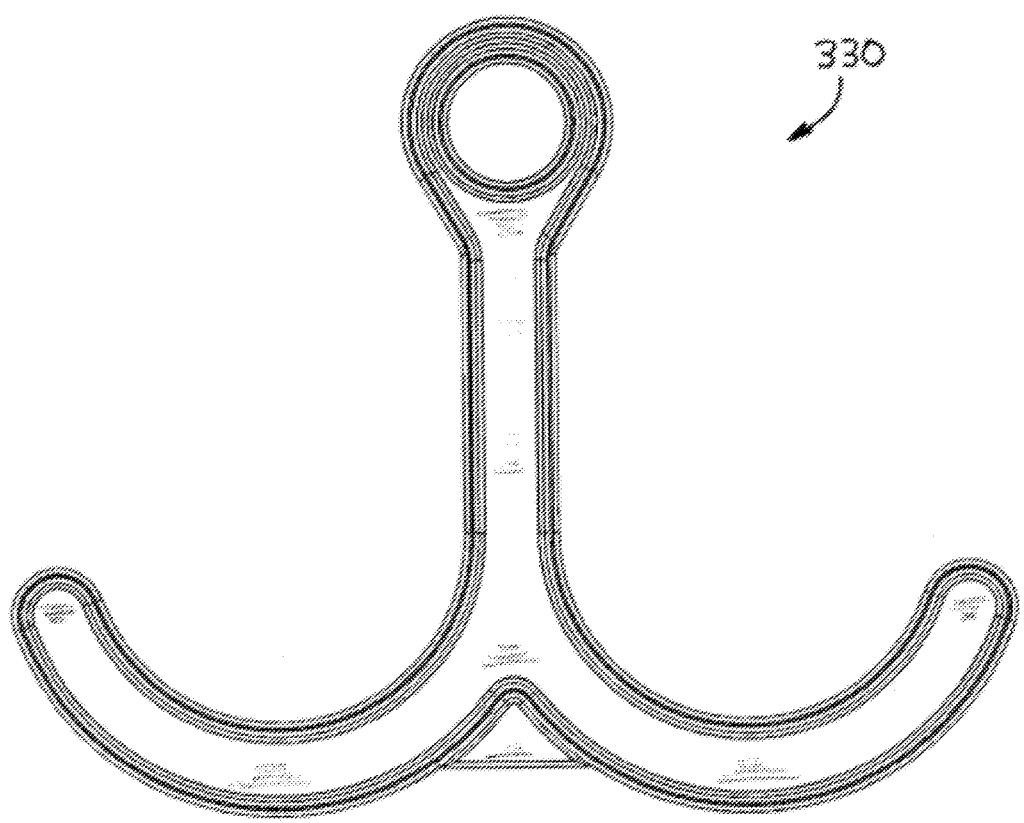
FIG. 27 is a front elevation view of the hook shown in FIG. 25, with the rear elevation view being identical.
Figure 28:
FIG. 28 is a bottom plan view of the hook shown in FIG. 25.
Figure 29:
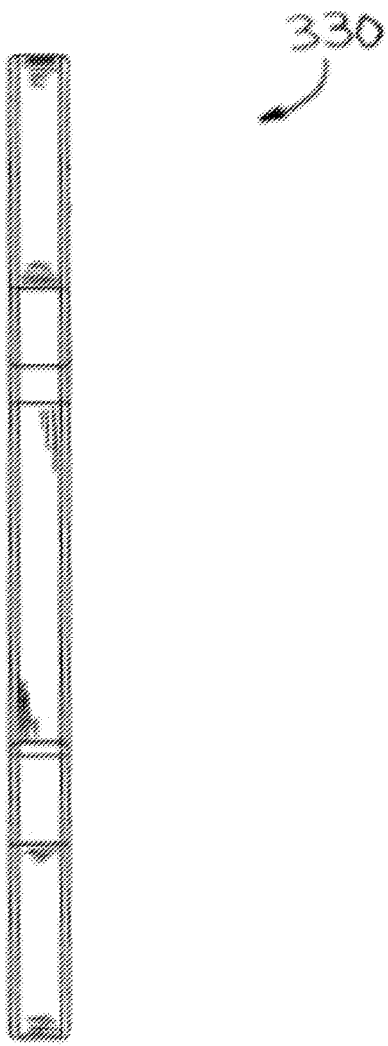
FIG. 29 is a left elevation view of the hook shown in FIG. 25, with the right elevation view being a mirror image thereof.
Figure 30:
FIG. 30 is a top plan view of the hook shown in FIG. 25

An alternative embodiment of an organization kit 300 according to the present invention is shown FIGS. 25-30. Organization kit 300 can be used to suspend items from a ceiling via ceiling joists 54. Referring to FIG. 25, organization kit includes two clevises 310, each of which that can be releasably secured to a separate ceiling joist 54, such as, for example, via screws (not shown). An exemplary clevis 310 is shown in FIG. 25A Clevis 310 includes a generally planar base portion 312 having a plurality of through holes 314 sized to accept and retain a securing member, such as, for example, a screw (not shown) for securing clevis 310 to ceiling joists 54. A generally U-shaped support member 316 extends outwardly from one side of base portion 312. Support member 316 has an opening 318 extending therethrough that is sized to allow a support rod, such as, for example, rod 320 or rod 140, shown in FIG. 1.

Typically, ceiling joists 54 are spaced about 24 inches apart from each other, so it is desired that rod 320 be longer than 24 inches, such as, for example, 30 inches. It is noted, however, that many storage sheds have the ceiling joists spaced about 16 inches apart on center, so a 30 inch rod 320 can be cut in half, forming two rods that can be used in a 16 inch spacing. Still further, organization kit 300 can have more than two clevises 310 to support a significantly longer rod 320, such as a 52 inch or a 60 inch rod that can span three ceiling joists 54, with a clevis 310 attached to each ceiling joist 54. Optionally, and 322 can be releasably attached to either end of rod 320 to keep rod 320 from inadvertently sliding out of opening 318 in clevis 310.

After inserting rod 320 through opening 318 in a first clevis 310, but before inserting rod 320 through opening 318 in a second bracket, at least one hook 330 can be slid over rod 320 (two hooks 330 are shown in FIG. 25). Details of hook 330 are shown in more detail in FIGS. 26-30. Alternatively or in addition, hooks 150, shown FIG. 1, can be used.

Referring to FIGS. 31-46, an organizer kit 400 according to another exemplary embodiment of the present invention is shown. Organizer kit 400 is used to construct storage assemblies that are secured between studs 50, 50' supporting a wall 52.

Figure 32:
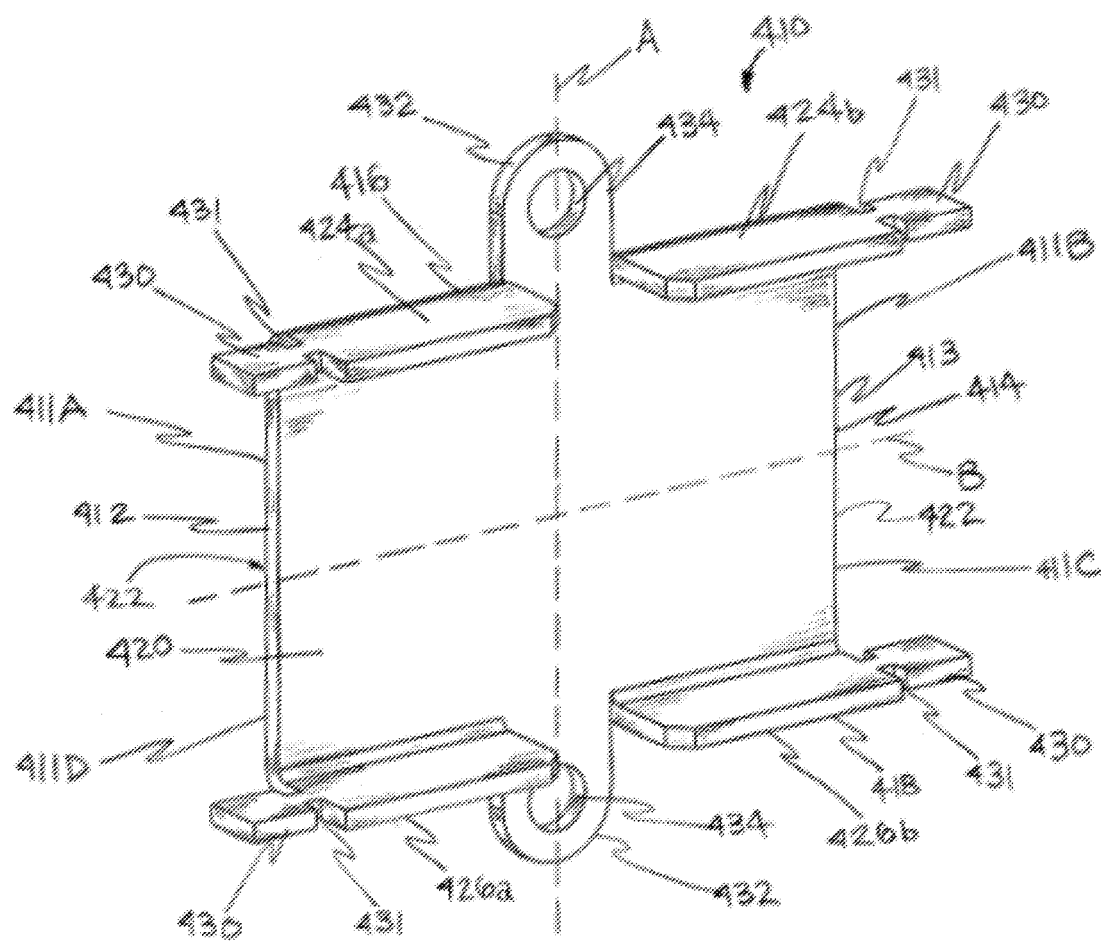
FIG. 32 is a front perspective view of a bracket used with the organization kit shown in FIG. 31.
Figure 33:
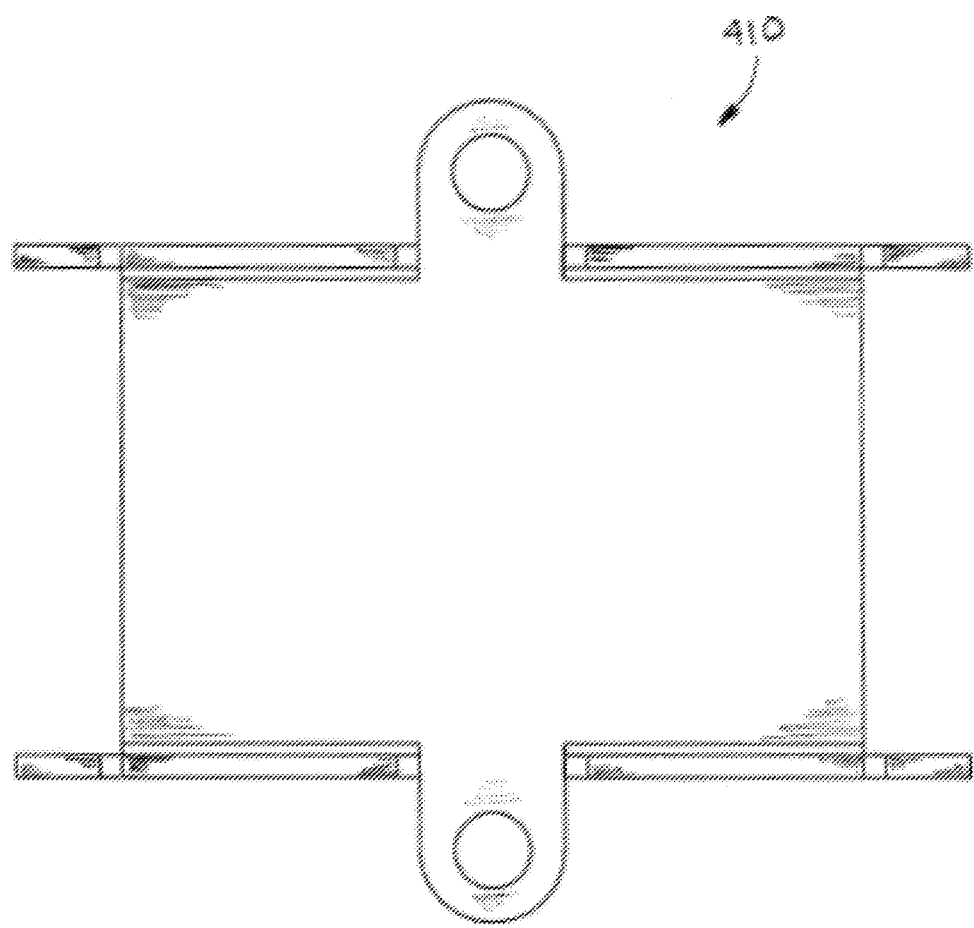
FIG. 33 is a front elevational view of the bracket shown in FIG. 32.
Figure 34:
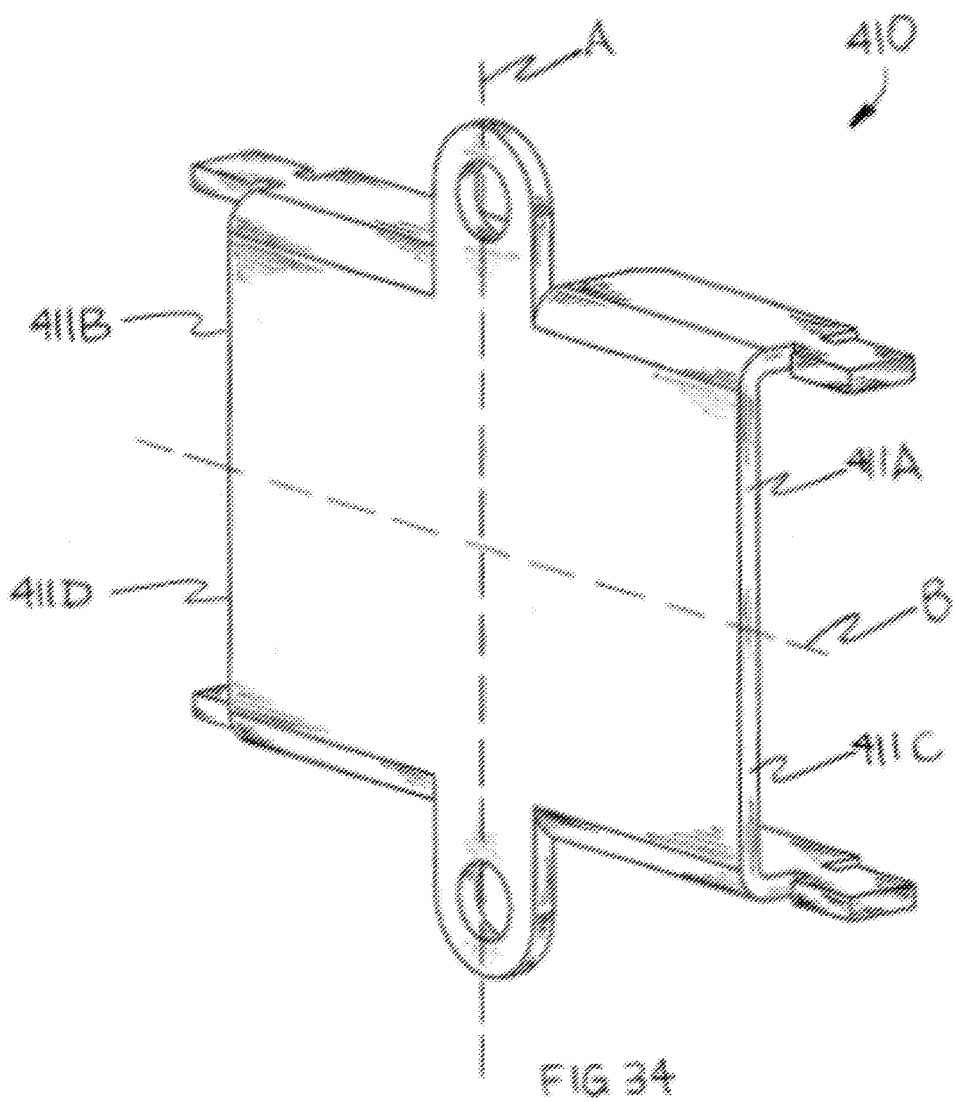
FIG. 34 is a rear perspective view of the bracket shown in FIG. 32.
Figure 35:
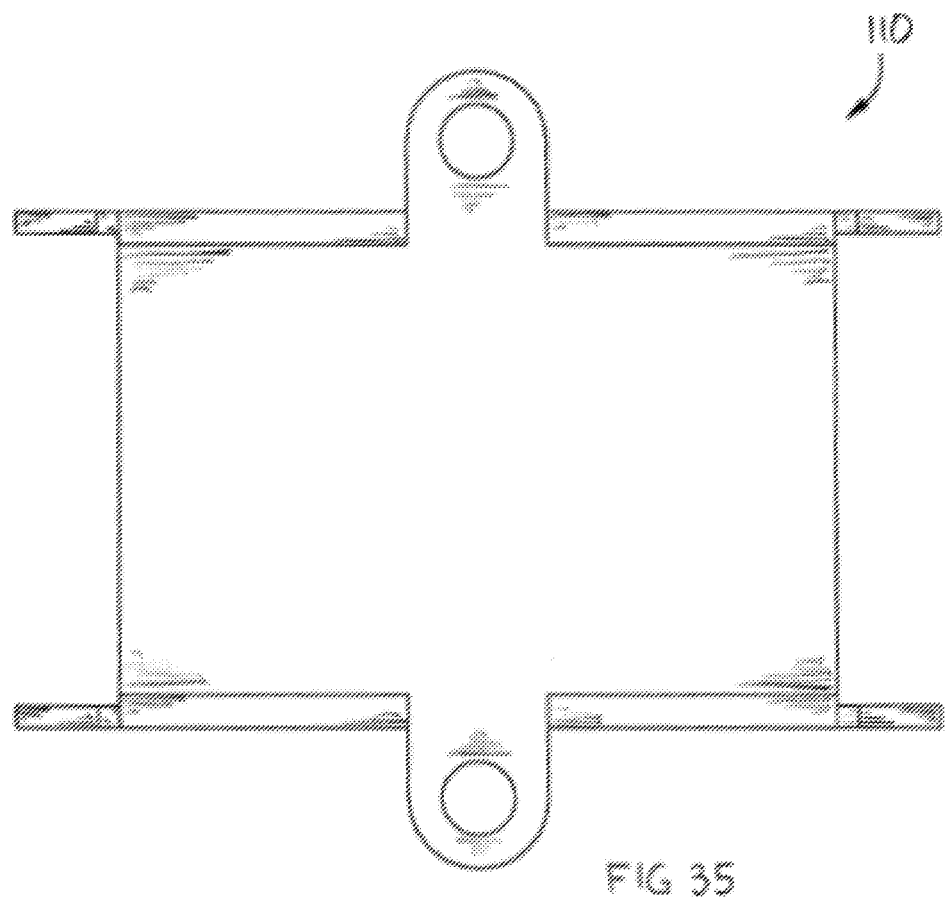
FIG. 35 is a rear elevational view of the bracket shown in FIG. 32.
Figure 36:
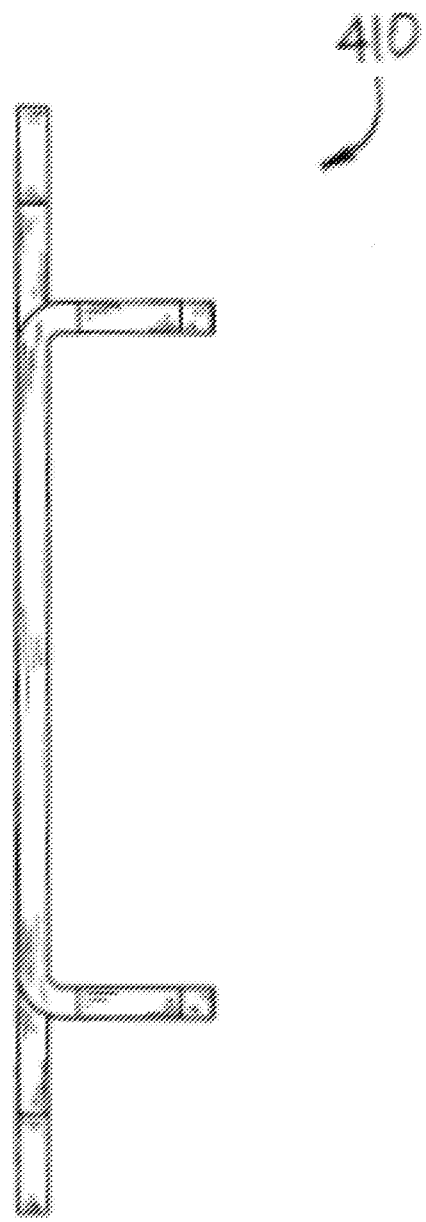
FIG. 36 is a left side elevational view of the bracket shown in FIG. 32, the right side elevational view being a mirror image thereof.
Figure 37:
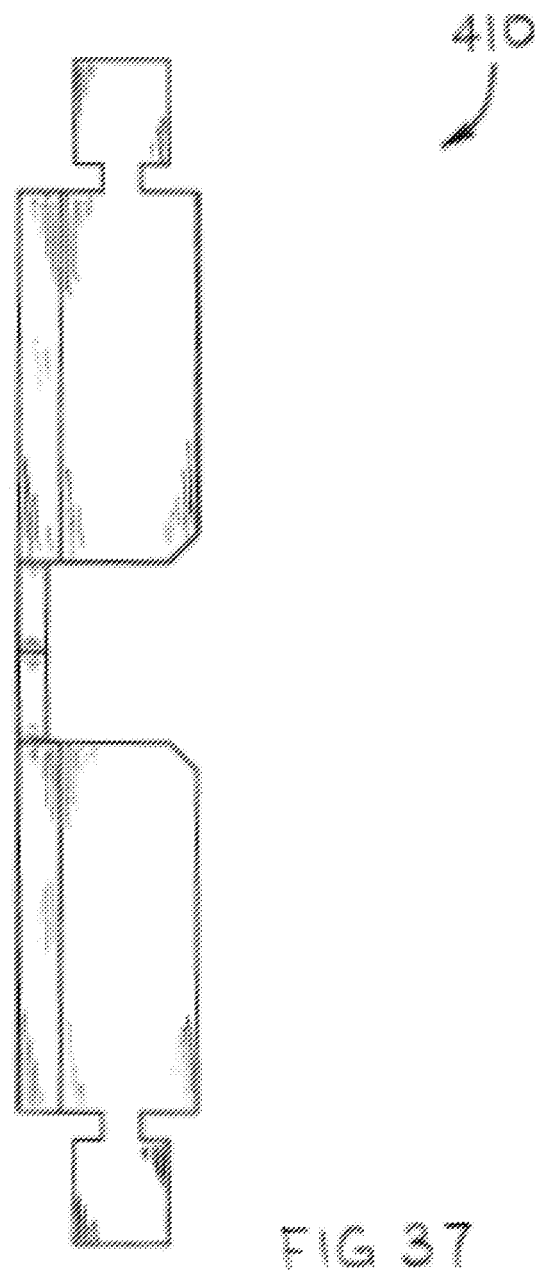
FIG. 37 is a top plan view of the bracket shown in FIG. 32, the bottom plan view being identical.

Organizer kit 400 includes a universal wall bracket 410 that is used to support several different storage units. Wall bracket 410 can be manufactured from a stamped metal, such as, for example, 16 gauge galvanized steel. Referring to FIG. 32, wall bracket 410 is symmetric about a longitudinal axis "A" as well as a lateral axis "B". Axes "A" and "B" divide bracket 410 into four quadrants 411A, 411B, 411C, and 411D. Such symmetry allows bracket 410 to be installed on wall studs 50, without regard to a "top" or a "bottom" and of bracket 410.

Bracket 410 is a generally planar rectangular body 413 having a first longitudinal side 412 and a second longitudinal side 414, parallel to first longitudinal side 412 and to longitudinal axis "A". Additionally, bracket has a first lateral side 416 extending between first longitudinal side 412 and second longitudinal side 414, and a second lateral side 418, parallel to first lateral side 416 and to lateral axis "B", and extending between first longitudinal side 412 and second longitudinal side 414. Axes "A" and "B" each bisect body 413. Bracket 410 also has a front face 420 and a rear face 422. In an exemplary embodiment, bracket 410 has a width of about 2⅛ inches and a length of about 2.50 inches.

Bracket 410 includes two pairs of outwardly extending supports 424a, 424b and 426a, 426b that extend generally perpendicularly outwardly from front face 420 on either side of lateral axis "B". Supports 424a/b, 426a/b are spaced sufficiently apart from each other to enable an elongate rod 440 (shown in FIG. 31), a small shelf 460 (shown in FIG. 38), or a large shelf 170 (shown in FIGS. 39 and 46) be inserted and received therebetween. Each support 424a/b, 426a/b includes a tab 430 and a notch 431 extending toward each of first longitudinal side 412 and second longitudinal side 414. Each quadrant 411A, 411B, 411C, and 411D includes a tab 430 and notch 431. Tabs 430 can be selectively bent toward lateral axis "B", such as by pliers, at respective notches 431 after rod 440 has been inserted between supports 424a/b, 426a/b, as shown FIG. 31, to retain rod 440 between supports 424a/b, 426a/b. Notches 431 dictate approximately where tab 430 bends.

A tang 432 extends away from lateral axis "B" between supports 424a and 424b and between supports 426a and 426b. Each tang 432 includes a through opening 434 sized to allow the insertion of a retaining member, such as, for example, a screw, a nail, a brad, or the like (not shown) therethrough to secure bracket 410 to wall stud 50.

Figure 31:
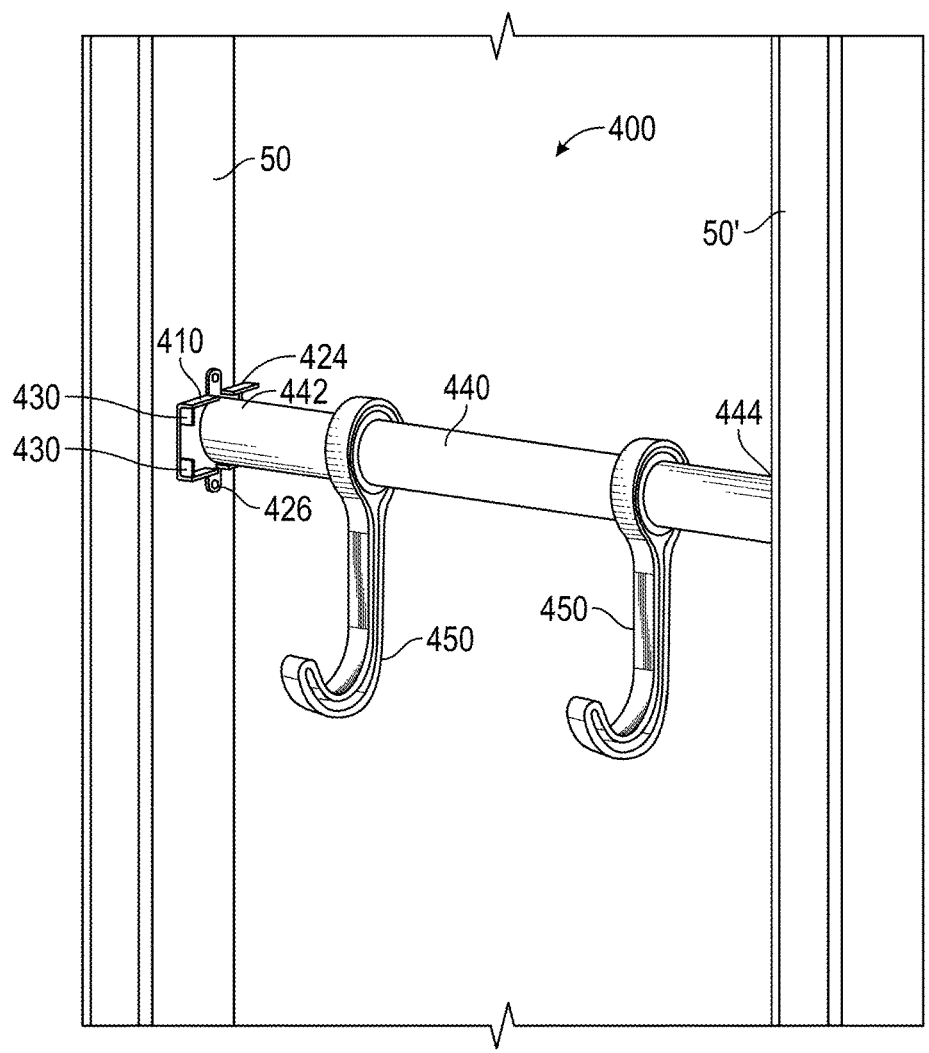
FIG. 31 is a perspective view of an organization kit according to a fifth exemplary embodiment of the present invention.

Optionally, hooks 450, part of kit 400, may be slid over an end 442, 444 of rod 440 and suspended from rod 440 as shown FIG. 31. Hook 450 can be similar to or identical to book 150. End 442 of rod 440 is inserted between supports 424a/b, 426a/b on bracket 410 attached to stud 50 and end 444 of rod 440 is inserted between supports 424a/b, 126a/b on bracket 410 attached to stud 50'.

Tabs 430 on each of supports 424a/b, 426a/b farthest from wall 52 are bent toward lateral axis "B", releasably securing rod 440 to both brackets 410. Such bending can be performed using a tool, such as a hammer or pliers. Optionally, although not required, tabs 430 on each of supports 424a/b, 426a/b closest to wall 52 may also be bent toward lateral axis "B" to prevent rod 440 from being pushed too close to wall 52. However, bracket 410 is sufficiently wide enough and mounted close enough to wall 52 such that rod 440 cannot slide between supports 424a/b, 426a/b and wall 52 and fall off bracket 410. If it is desired to remove rod 440 from between studs 50, 50' for any reason, a user can use a hand tool to pry tabs 430 away from lateral axis "B", such as with pliers.

Figure 38:
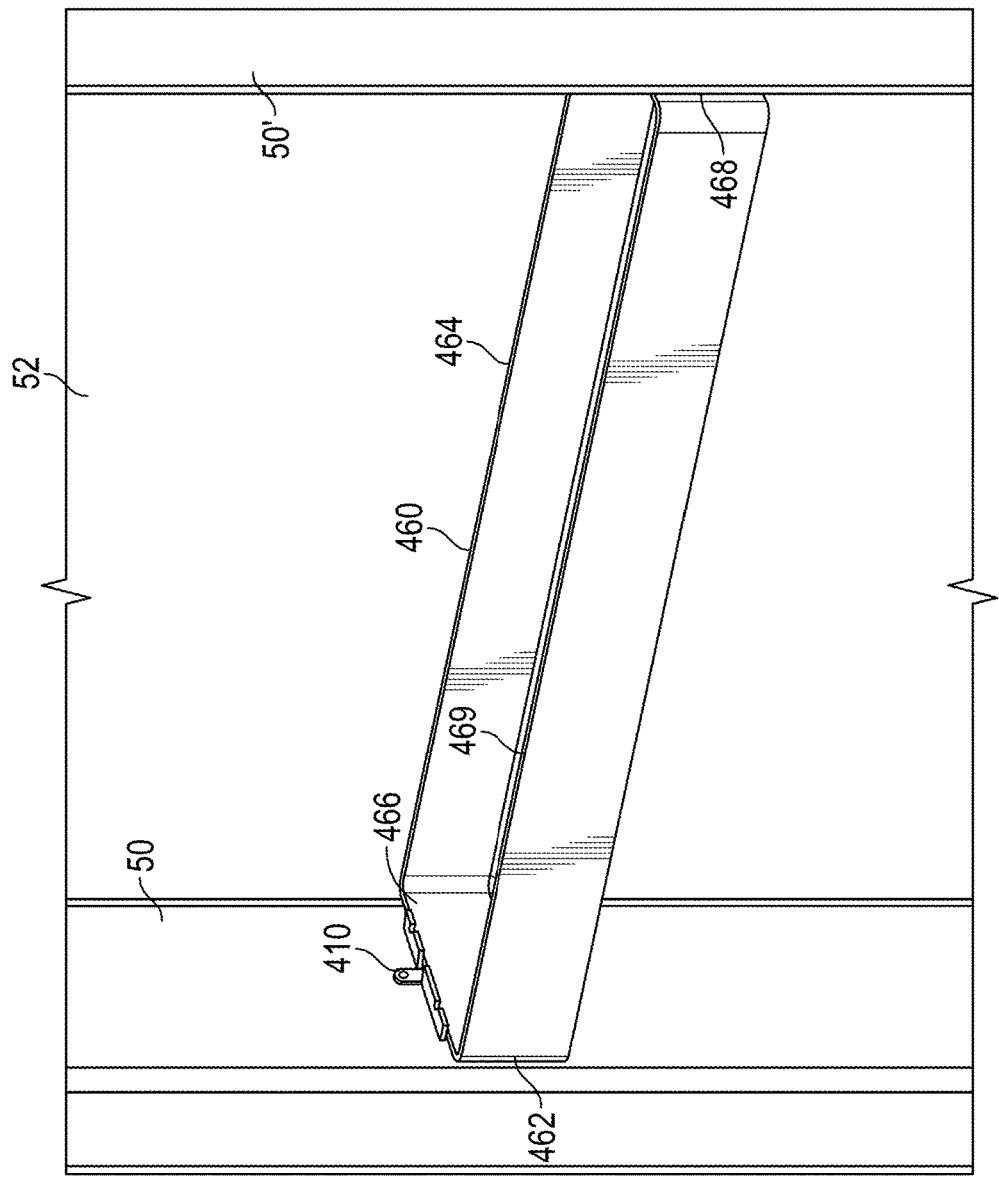
FIG. 38 is a perspective view of an organization kit according to a sixth exemplary embodiment of the present invention.
Figure 39:
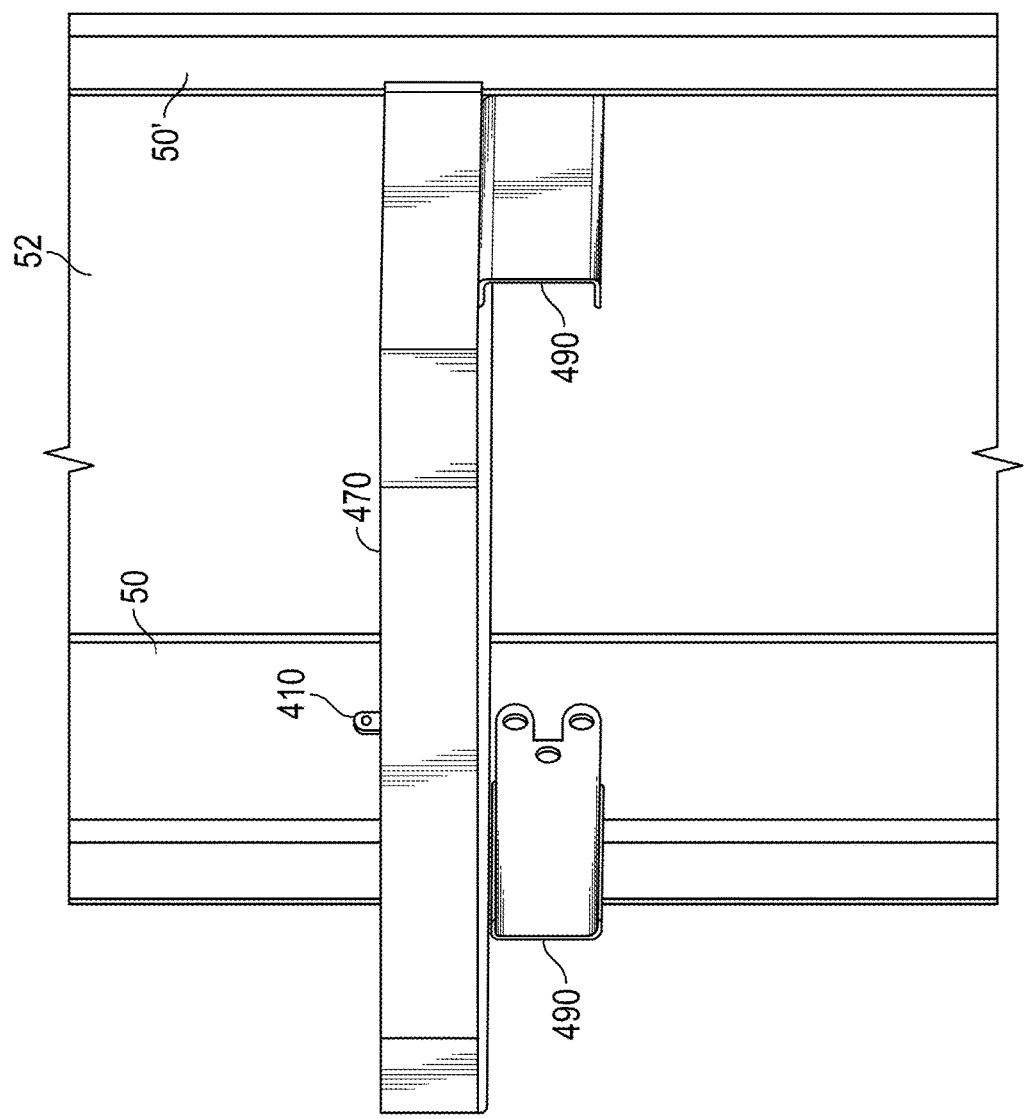
FIG. 39 is a bottom perspective view of an organization kit according to a seventh exemplary embodiment of the present invention.
Figure 40:
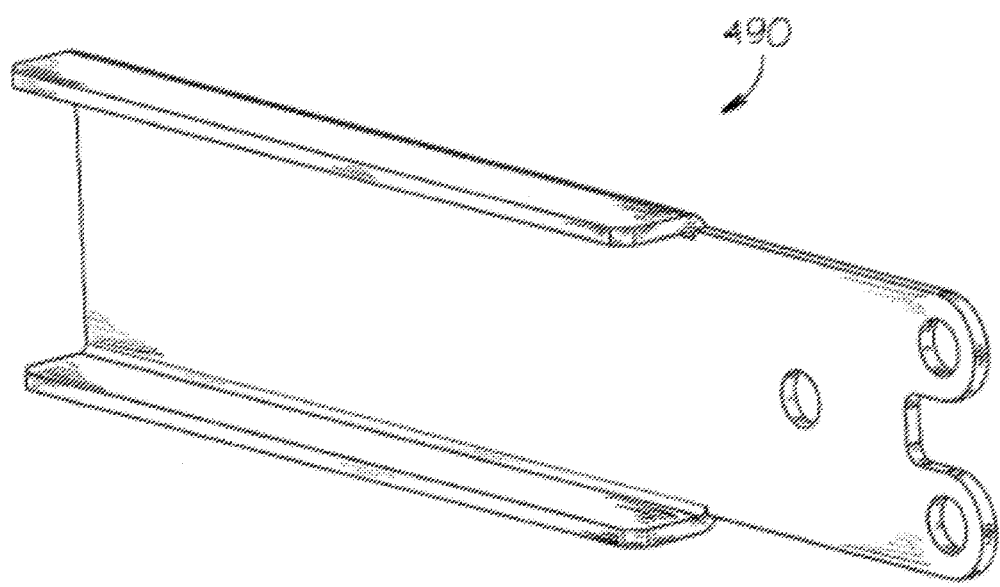
FIG. 40 is a front perspective view of an extension piece used with the kit shown in FIG. 39.
Figure 41:
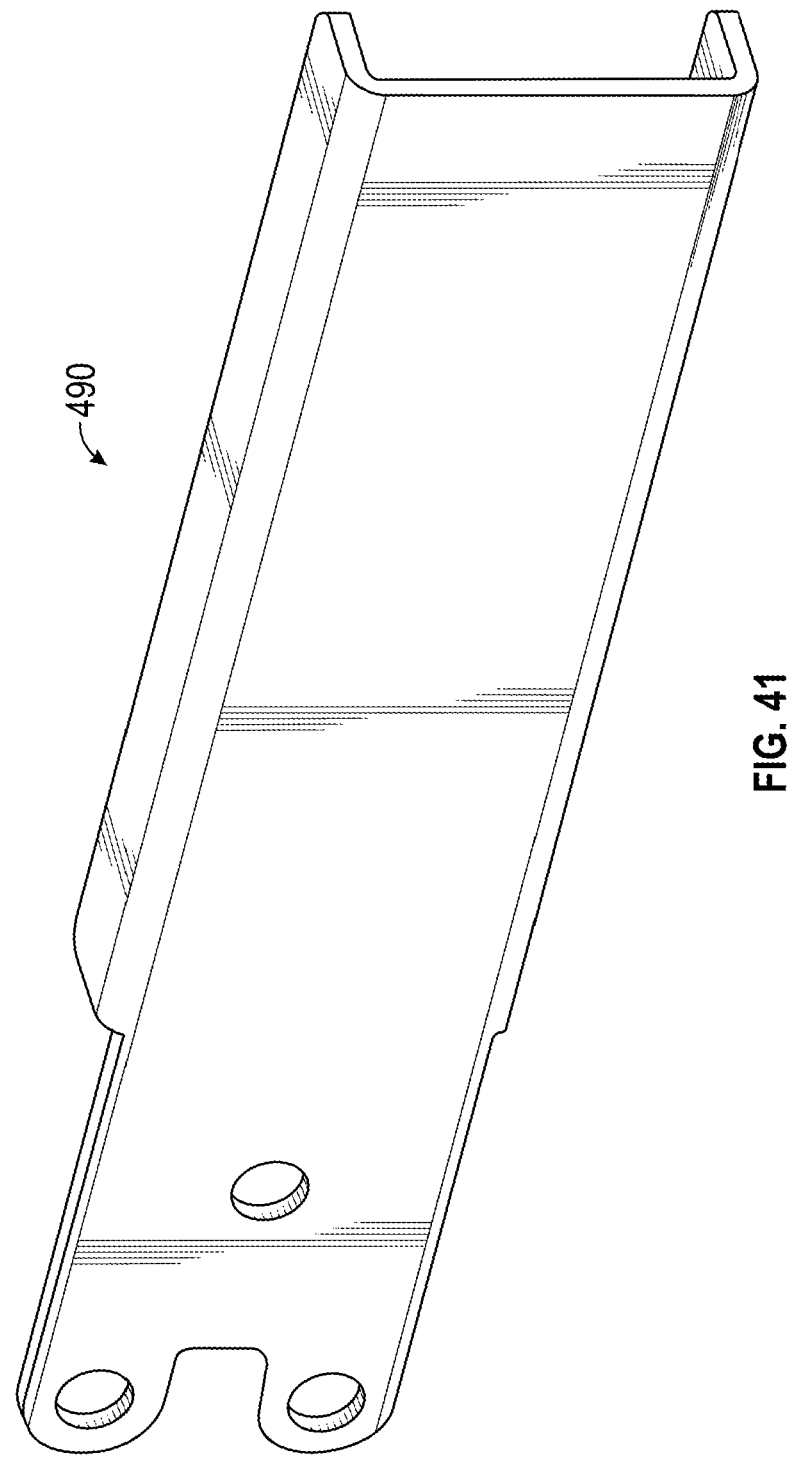
FIG. 41 is a rear perspective view of the extension piece shown in FIG. 40.
Figure 42:
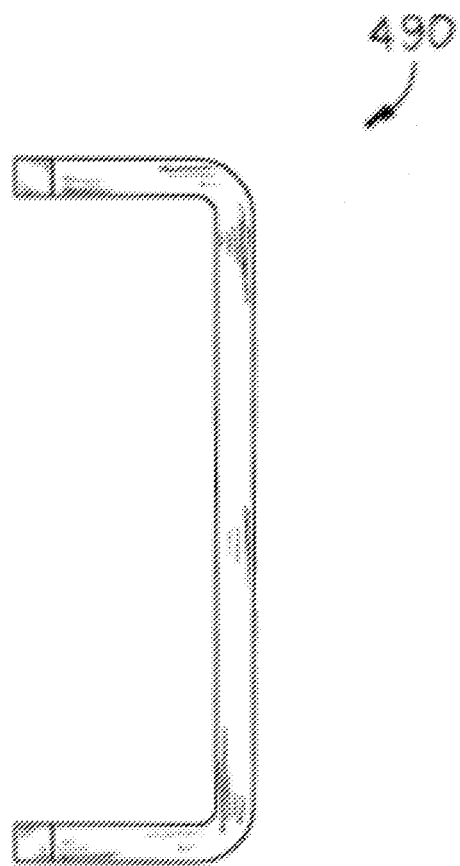
FIG. 42 is a side elevational view of the extension piece shown in FIG. 40.
Figure 43:
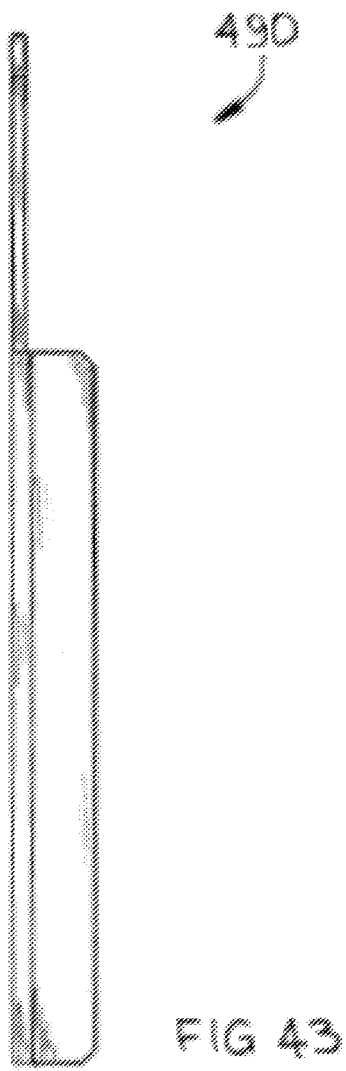
FIG. 43 is a top plan view of the extension piece shown in FIG. 40, with the bottom plan view being a mirror image thereof.

Alternatively, instead of using brackets 410 to support rod 440, brackets 410 can be used to support small shelf 460, small shelf 460 being a part of kit 400, as shown FIG. 38. Shelf 460 is an elongated concave container having opposing longitudinal sides 462, 464 connected by opposing lateral sides 466, 468 and having a generally flat bottom 469 extending within a perimeter defined by longitudinal sides. 462, 464, and lateral sides. 466, 468.

Longitudinal sides 462, 464 have a length of slightly less than about 14½ inches so that shelf 460 can easily slide between studs 50, 50'. Lateral sides 466, 468 each have a length that is about 3½ inches long (approximately the width of a standard 2×4 stud) and a height that is slightly less than the distance between supports 124a/b, 126a/b of bracket 410 so that shelf 460 can be easily slid between supports 424a/b, 426a/b. Alternatively, instead of inserting shelf 460 between supports 424*a/b*, 426*a/b*, shelf 460 can be placed on top of supports 424*a/b*. In that configuration, the height of lateral sides 466, 468 is not constrained by the distance between supports 424*a/b*, 426*a/b* and can be any height.

Figure 44:
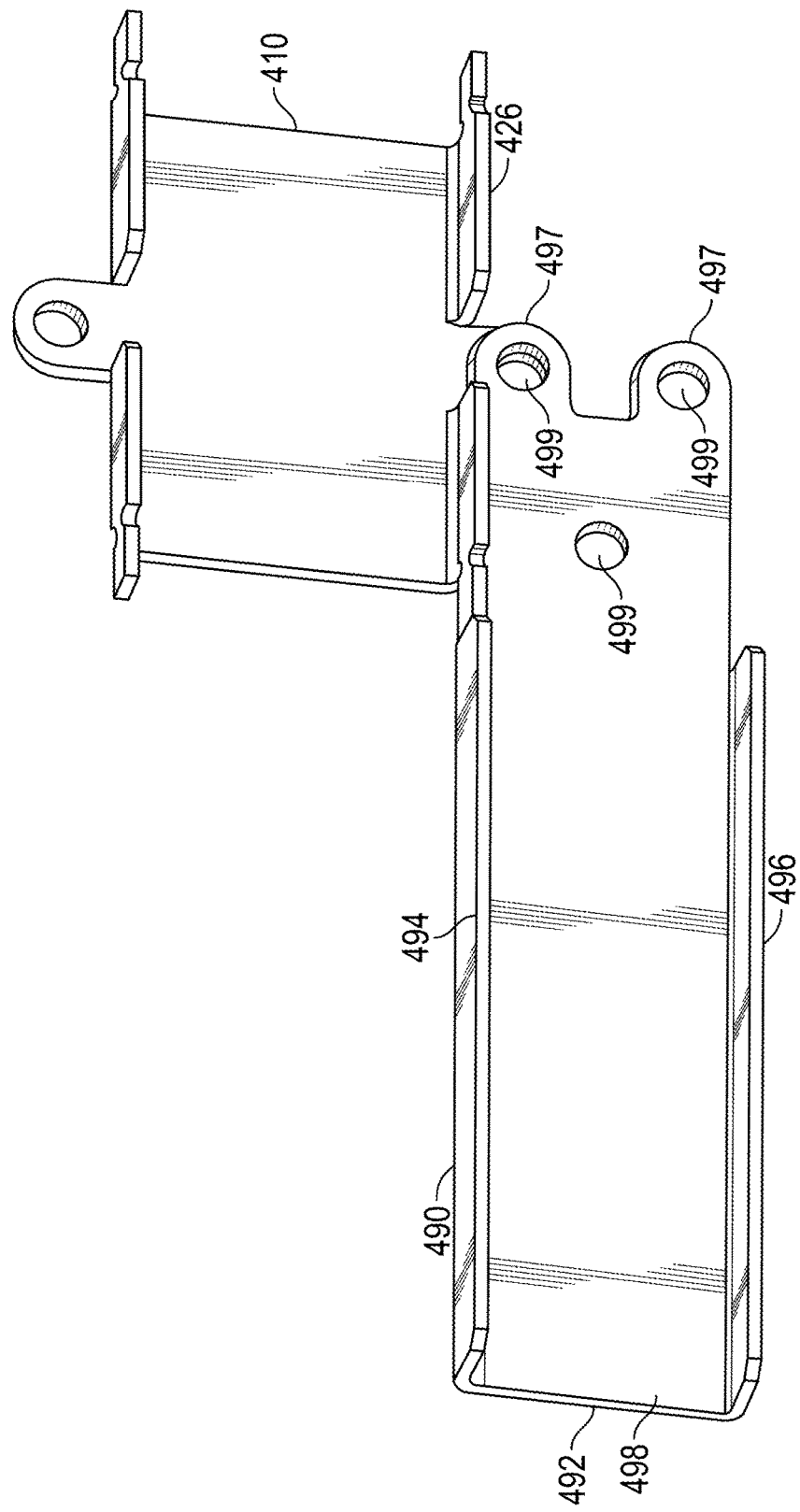
FIG. 44 is a front perspective view of a bracket and extension piece shown in the organization kit of FIG. 39.
Figure 45:
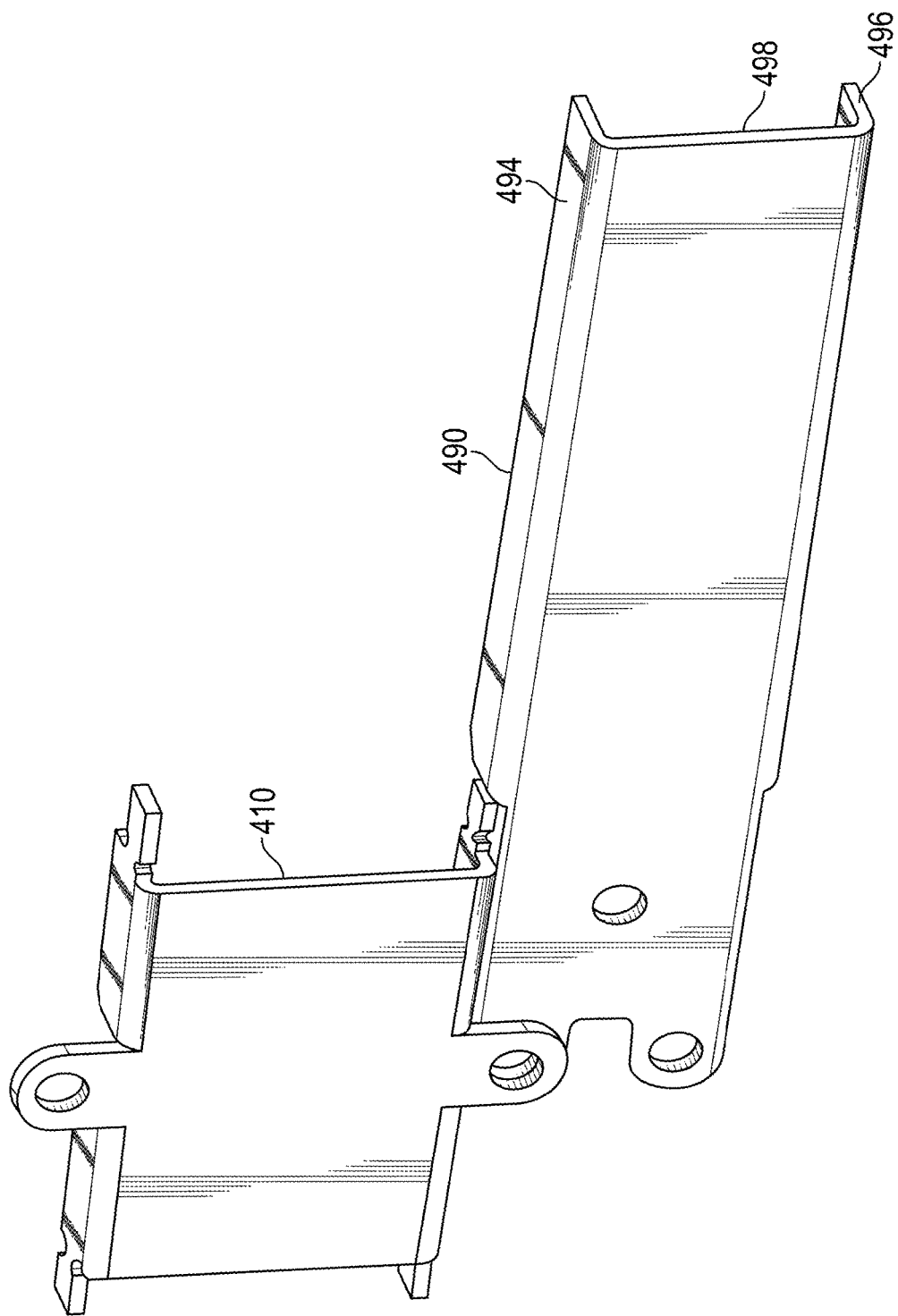
FIG. 45 is a rear perspective view of the bracket and extension piece shown in FIG. 44.

As shown in FIGS. 39-45, an extension piece 490 is releasably attached to each bracket 410. FIGS. 44 and 45 show extension piece 490 attached to bracket 410 without large shelf 470. Extension piece 490 includes an elongate generally U-shaped channel 492 having a top leg 494 and a bottom leg 496. A connector portion 498 extends between top leg 494 and bottom leg 496.

As shown in FIG. 44, connector portion 498 includes a pair of tangs 497 extending from an end thereof. Each tang 497 includes a through opening 499 extending therethrough sized to allow the insertion of a retaining member, such as, for example, a screw, a nail, a brad, or the like (not shown) therethrough to secure extension piece 490 to wall stud 50. An additional through opening 499 is formed in the body of connector portion 498.

Typically, bracket 410 is first installed on stud 50 by securing top tang 497 with a retaining member. Through opening 499 in an upper tang 497 on extension piece 490 is aligned with through opening 434 in a lower tang 432 on bracket 410 and the retaining member is then driven through each of through openings 499 and into stud 150 (see FIG. 39) to support extension piece 490. After extension piece 490 is attached to stud 410, large shelf 470 can be slid over top leg 494 and between supports 424*a/b*, 426*a/b*. At least a portion of large shelf 470 that extends beyond studs 50, 50' is supported by extension piece 490, as shown in FIG. 46.

Figure 46:
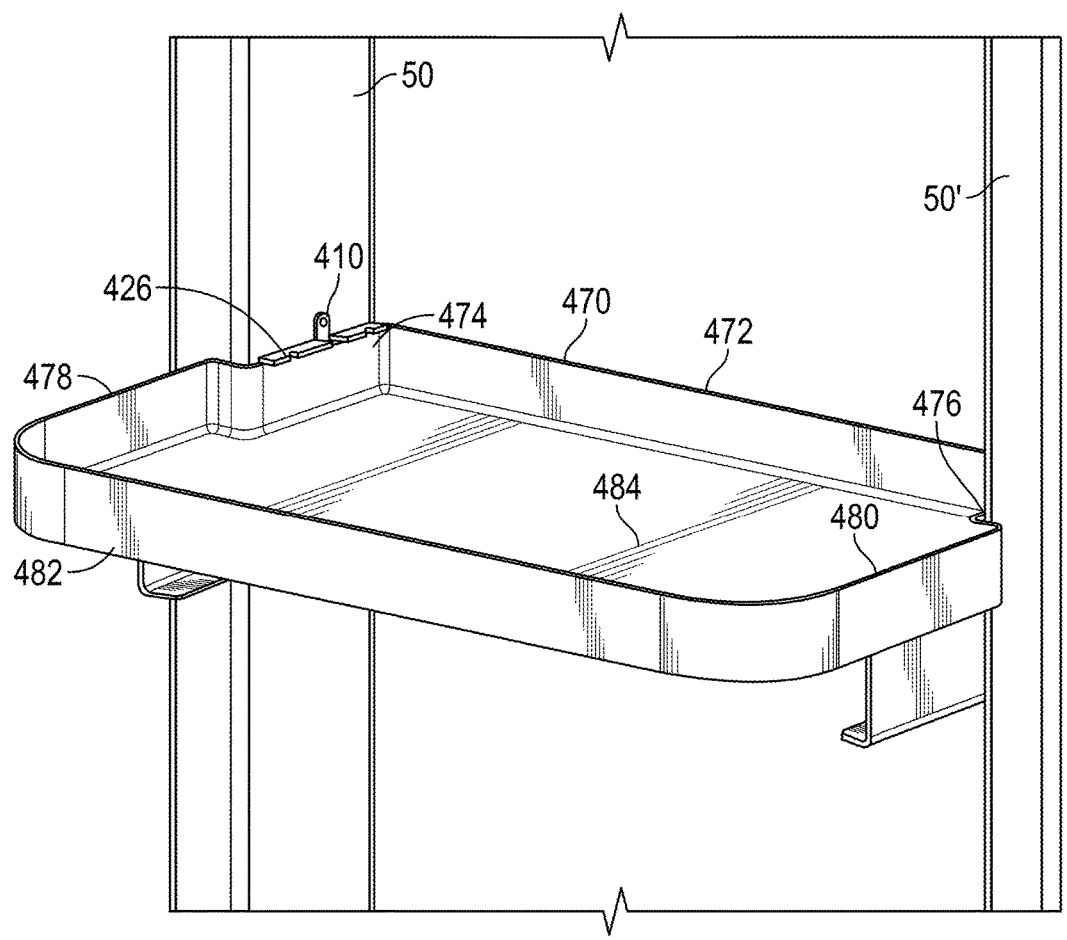
FIG. 46 is a top perspective view of the organization kit shown in FIG. 39.

Referring to FIG. 46, large shelf 470 has a generally concave body with a rear wall 472 that has a length of slightly less than 14½ inches, to accommodate the spacing between studs 50, 50'. Rear lateral walls 474, 476 extend parallel to each other from rear wall 472. Rear lateral walls 474, 476 have a height slightly less than the distance between supports 416, 418 so that rear lateral walls 474, 476 can slide between supports 416, 418. Optionally, rear lateral walls 474, 476 have a length of slightly over 3½ inches to extend beyond the width of a standard 2"×4" or 2"×3" stud. Alternatively, although not shown, rear lateral walls 474, 476 can have a length that defines the entire depth of large shelf 470.

As shown FIG. 46, however, large shelf 470 can include forward lateral walls 478, 480 connected to rear lateral walls 474, 476, respectively, such that forward lateral walls 478, 480 extend outwardly beyond studs 50, 50' are separated from each other by a distance greater than the standard 14½ inch spacing between studs 50, 50'. A front wall 482 connects forward lateral walls 478, 480. A shelf surface 484 defines the internal perimeter of shelf 470 bounded by rear wall 472, rear lateral walls 474, 476, forward lateral walls 478, 480, and front wall 482.

Elements of organization kits 100, 200, 300, 400 can be provided separately or together as mix-and-match kits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A removable bracket in combination with a shelf and a rod, the bracket comprising:
   a generally planar body having a longitudinal side and an adjacent lateral side, the body further having a front face and an opposing rear face;
   a longitudinal axis extending parallel to the longitudinal side and bisecting the bracket such that the bracket is symmetrical about the longitudinal axis, and a lateral axis extending parallel to the lateral side and bisecting the bracket such that the bracket is symmetrical about the lateral axis;
   a first support extending outwardly from the front face and parallel to the lateral axis, the first support having a first tab extending co-planar with the first support, the first tab being bendable toward the lateral axis;
   a second support extending outwardly from the front face and parallel to the lateral axis and to the first support, the second support having a second tab extending co-planar with the second support, the second tab being bendable toward the lateral axis,
   wherein positioning of the tabs allows for interchangeably supporting either the shelf or the rod, such that:
      when the first tab is co-planar with the first support and the second tab is co-planar with the second support, the shelf is slidable and retained between the first and second supports; and
      when the first and second tabs are bent toward the lateral axis, the rod is securable between the first and second supports, such that the first and second tabs retain the rod between the first and second supports;
   means for securing the body to a structure, the means extending away from the body.

2. The removable bracket according to claim 1, further comprising a lip extending outwardly from the front face.

3. The removable bracket according to claim 2, wherein the lip comprises:
   an offset length extending generally perpendicularly to the front face parallel to the lateral side; and
   a pry face extending from the offset length generally parallel to the front face and away from the body.

4. The removable bracket according to claim 1, further comprising at least one slot extending parallel to the longitudinal side.

5. The removable bracket according to claim 4, further comprising an extension piece removably attachable to the body, the extension piece having a spike sized to fit into the slot.

6. The removable bracket according to claim 1, wherein the first support is disposed on one side of the lateral axis and the second support, identical to the first support, is disposed on an opposing side of the lateral axis.

7. A removable bracket comprising:
   a generally planar body having a first longitudinal side and an adjacent lateral side, the body further having a front face and an opposing rear face;
   a longitudinal axis extending parallel to the first longitudinal side and a lateral axis extending parallel to the lateral side;
   a first support extending outwardly from the front face parallel to the lateral axis, the first support having a first tab extending co-planar with the first support, the first tab being bendable to a position parallel to the longitudinal axis and the first support having a second tab extending co-planar with the first tab, the second tab being bendable to a position parallel to the longitudinal axis;
   a second support extending outwardly from the front face parallel to the lateral axis, the second support having a third tab extending co-planar with the second support, the third tab being bendable to a position parallel to the longitudinal axis and the second support having a fourth tab extending co-planar with the first tab, the fourth tab being bendable to a position parallel to the longitudinal axis,
wherein positioning of the tabs allows for interchangeably supporting either a shelf or a rod, such that:
when the first tab and the second tab of the first support and the third tab and the fourth tab of the second support, respectively, are co-planar with the first support and the second support, respectively, the bracket is adapted to receive and support the shelf between the first support and the second support,
when the first tab, the second tab, the third tab and the fourth tab are bent to the position parallel to the longitudinal axis, the bracket is adapted to support the rod between the first and second supports;
wherein the body comprises first, second, and third coplanar portions, the first portion extending between the first and second supports, the second portion extending upwardly from the first support and away from first portion, and the third portion extending downwardly from the second support and away from the first portion.

8. The removable bracket according to claim 7, further comprising a notched portion connecting the first tab to the first support.

9. The removable bracket according to claim 7, wherein the bracket is symmetric about the lateral axis.

10. The removable bracket according to claim 7, wherein the bracket is symmetric about the longitudinal axis.

11. The removable bracket according claim 7, further comprising a spike extending outwardly from the body.

12. A removable bracket comprising:
a planar body having a first longitudinal side, a second longitudinal side, a first lateral side extending between the first longitudinal side and the second longitudinal side, and a second lateral side extending between the first longitudinal side and the second longitudinal side;
a support extending outwardly from the body, the support having:
a first support portion extending parallel to the first lateral side, the first support portion having a first tab at either end thereof, the first tabs being adapted to be moved between a first position parallel to the first lateral side and a second position parallel to the first longitudinal side; and
a second support portion extending parallel to the second lateral side, the second support portion having a second tab at either end thereof, the second tabs being adapted to be moved between a first position parallel to the second lateral side and a second position parallel to the second longitudinal side,
wherein positioning of the tabs between the first and second positions allows for interchangeably supporting either a shelf or a rod, such that:
when the first tabs and the second tabs are in the first position, the bracket is adapted to support the shelf between the first support portion and the second support portion, and
when the first tabs and the second tabs are in the second position, the bracket is adapted to support the rod between the first support portion and the second support portion;
wherein, a first portion of the body extends between the first support portion and the second support portion, a second portion of the body is co-planar with the first portion of the bodes and extends from the first support portion, away from the first portion, to the first lateral side, and a third portion of the body is co-planar with the first portion of the body and extends from the second support, away from the first portion, to the second lateral side.

13. The removable bracket according to claim 12, wherein the body is bisected by a lateral axis and wherein the body is symmetric about the lateral axis.

14. The removable bracket according to claim 13, wherein the body is bisected by a longitudinal axis and wherein the body is symmetric about the longitudinal axis.

15. The removable bracket according to claim 14, wherein, when the first tabs and the second tabs are in the first position, the first tabs and the second tabs extend away from the longitudinal axis.

16. The removable bracket according to claim 14, wherein, when the first tabs and the second tabs are in the second position, the first tabs and the second tabs extend toward the lateral axis.

17. The removable bracket according to claim 12, further comprising a spike extending outwardly from the body.

* * * * *